(12) United States Patent
Frisken et al.

(10) Patent No.: US 7,457,547 B2
(45) Date of Patent: Nov. 25, 2008

(54) OPTICAL CALIBRATION SYSTEM AND METHOD

(75) Inventors: Steven J. Frisken, Vaucluse (AU); Glenn W. Baxter, Hornsby Heights (AU); Hao Zhou, Sydney (AU); Dmitri Abakoumov, Lakemba (AU)

(73) Assignee: Optium Australia Pty Limited, Eveleigh New South Wales (AU)

( * ) Notice: Subject to any disclaimer, the term of this patent is extended or adjusted under 35 U.S.C. 154(b) by 591 days.

(21) Appl. No.: 10/984,594

(22) Filed: Nov. 8, 2004

(65) Prior Publication Data

US 2006/0098156 A1    May 11, 2006

(51) Int. Cl.
  *H04B 10/00* (2006.01)
(52) U.S. Cl. ................. 398/158; 398/159; 398/151; 398/119
(58) Field of Classification Search ................. 398/158, 398/159, 151, 119
  See application file for complete search history.

(56) References Cited

U.S. PATENT DOCUMENTS 6,674,519 B2 * 1/2004 Mui ........................... 356/121
6,735,012 B2 * 5/2004 Hunt .......................... 359/279
7,292,790 B1 * 11/2007 Sardesai ..................... 398/148
7,369,773 B2 * 5/2008 Weiner ........................ 398/81
2005/0024613 A1 * 2/2005 Bleeker ....................... 355/67

* cited by examiner

Primary Examiner—M. R. Sedighian
(74) Attorney, Agent, or Firm—Kurt Rauschenbach; Rauschenbach Patent Law Group, LLC

(57) ABSTRACT

In an optical system including an optical input port for projecting an input optical signal onto an optical phased matrix array, an optical phased matrix array including a plurality of individually addressable pixels thereon, each said pixel being drivable within a prescribed range of levels, and an optical output port for collecting a predetermined fraction of said optical signal received from said optical phased matrix array; a method of compensating for phase distortions including the steps of: (a) determining a plurality of transfer functions relating said level of each said pixel to the phase variation each said pixel introduces to light from said input optical signal which is incident thereon; and (b) controlling the level of selected ones of said pixels in accordance with a corresponding transfer function such that said fractional signal received at said output port is modified in phase to substantially compensate for optical phase distortions arising from said optical phased matrix array.

42 Claims, 20 Drawing Sheets

OPTICAL CALIBRATION SYSTEM AND METHOD

CO-PENDING APPLICATIONS

Various methods, systems and apparatus relating to the present invention are disclosed in the following co-pending applications filed by the applicant or assignee of the present invention: U.S. application Ser. No. 10/706901 filed on 12 Nov. 2003; U.S. application Ser. No. 10/868521 filed on 14 Jun. 2004; U.S. application filed on 27 Sep. 2004 under Ser. No. 11/952,223; and Australian application 2004904650 filed on 16 Aug. 2004. The disclosures of these co-pending applications are incorporated herein by cross-reference.

FIELD OF THE INVENTION

The current invention relates to calibration methods for optical devices, and in particular to calibration methods for reconfigurable optical wavelength processing devices for use in telecommunications applications which incorporate a liquid crystal spatial light modulator (SLM).

BACKGROUND OF THE INVENTION

The recent growth in the demand for broadband services has resulted in a pressing need for increased capacity on existing communication channels. The increased bandwidth of fiber optic communication networks is still often insufficient to cope with this demand without utilizing the ability of these fibers to carry large numbers of individual communication channels, each identified by a discrete wavelength and each channel with a known bandwidth and separation from its adjacent channels. This technique is known as dense wavelength division multiplexing (DWDM) and standard channel designations for public networks are set by the International Telecommunications Union for channel spacings ranging between 200 GHz and 12.5 GHz.

The disadvantage associated with DWDM networks is that the increasing density of wavelength channels places increasing demand on network functionality for connecting the individual channels to individual destination points on a dynamic basis, and for the ability to add or drop an individual wavelength channel into or out of the optical signal. Currently these functions are primarily performed by electronic techniques but the demand for increased network speed and bandwidth calls for the development of techniques to perform these functions in the optical domain.

Two main techniques that have been developed to address this need are optical beam deflectors such as micro electromechanical (MEMS) mirror arrays or liquid crystal spatial light modulators (SLMs). Optical fibers deliver an input DWDM signal to a device, where the wavelength channels are demultiplexed with appropriate optics and directed to the beam deflector. The deflector routes the individual channels to a desired one many output ports. Since this routing is performed in free space it allows multiple signal beams to be simultaneously interconnected with minimal cross-talk between data channels.

As the demand for communications bandwidth increases, it will be required that more optical data channels are included on each optical fiber. This is likely to occur in stages and it will be common to see optical fibers carrying 32 individual wavelength channels in the same network as fibers carrying up to 128 wavelength channels or more. Standard liquid crystal devices are limited in the pixel density and fill factors that can be efficiently manufactured, thus severely limiting their functionality in DWDM applications. MEMS devices on the other hand can be manufactured with higher pixel densities. However, these devices are then limited to use in switching signals containing a predetermined number of channels i.e. a MEMS device that has been constructed for use in a system containing 64 individual wavelength channels cannot then be readily used where the signal contains 128 wavelength channels.

A relatively recent advancement in liquid crystal devices is the Liquid Crystal on Silicon (LCoS) SLM. The LCoS device is a reflective device where a liquid crystal is sandwiched between a transparent glass layer with a transparent electrode and a silicon substrate divided into a 2-dimensional array of individually addressed pixels. LCoS technology enables very high resolution devices with pixel pitch on the order of 10-20 µm and optical fill factors greater than 90%. Because of the high pixel densities possible with LCoS devices they have traditionally found application in high-definition display systems such as data and video projectors. The high pixel resolution and fill factors possible however, makes them uniquely suited to a channel by channel switching device which can be dynamically reconfigured to accommodate higher density DWDM applications.

A difficulty in transplanting this technology arises when the operating environments of LCoS devices in display applications is compared with that of telecommunications applications. In display applications, the LCoS is exposed to high intensities of light, including significant quantities of ultraviolet (UV) light. Thus, the typical lifetime of a display device only ranges between 5 to 10 years. Telecommunications components for deployment in a public communications network typically are rated for a useable lifetime of around 20 to 25 years. Also, they are generally only exposed to low intensities of light in the near infrared region. Thus, there are different failure mechanisms for the liquid crystal components between the technologies that must be accounted for and understood before deployment.

In display applications, such as high definition data and video projectors and televisions, calibration schemes for liquid crystal SLM components are focused on the brightness and contrast response of the SLM, and to check for pixel failure. They specifically concentrate on the phase response of the individual liquid crystal pixels to give a desired attenuation of incident light in order to display an image. The calibration is not typically concerned with corrective capabilities for the whole optical system in the device, nor is it usual to provide factors in the calibration for the long-term stability of the liquid crystal component to ensure that it remains relatively insensitive to phase variations or degradation over time.

The use of liquid crystal devices in telecommunications applications still requires a calibration of the phase response. This calibration, however, needs to be much more rigorous in order to accurately apply complex wavefront modification functions to the device. The functions may perform the multiple-port routing of wavelength channels, along with aberration correction functionality for the supporting optical system. Problems that can occur in the application of liquid crystal devices to DWDM switching applications can be attributed not only to irregularities in the liquid crystal device itself such as irregular phase response between pixels, but rather to aberrations from the surrounding optical elements as well. For example, surface irregularities of the optical elements or slight misalignments of the optical system are common causes of wavefront aberration. Since the system generally requires large beam sizes (>5 mm) to provide the required spectral resolution for a 50-GHz channel spacing, it displays significant sensitivity to these effects. Edge effects in the SLM pixels can also adversely affect the device performance. Consequently, it is necessary to have accurate knowledge of the individual pixel response across the whole face of the SLM.

Another of the challenges that needs to be overcome with liquid crystal technology is the temperature stability over a broad range of operating conditions. The phase response of the liquid crystal can vary significantly over typical operating temperatures for telecommunications devices which need to be accounted for and corrected.

SUMMARY OF THE INVENTION

It is an objective of the present invention to provide a method of calibrating an optical device including a liquid crystal element for use in optical telecommunications networks.

Consistory Clause

It is an objective of the present invention to provide a method of calibrating an optical device including a liquid crystal element for use in optical telecommunications networks.

In accordance with a first aspect of the present invention, there is provided an optical system including: an optical input port for projecting an input optical signal onto an optical phased matrix array, an optical phased matrix array including a plurality of individually addressable pixels thereon, each pixel being drivable within a prescribed range of levels, an optical output port for collecting a predetermined fraction of the optical signal received from the optical phased matrix array; there is provided a method of compensating for phase distortions in the optical system including the steps of:
 (a) determining a plurality of transfer functions relating the level of each pixel to the phase variation each pixel introduces to light from the input optical signal which is incident thereon; and
 (b) controlling the level of selected ones of the pixels in accordance with a corresponding transfer function such that the fractional signal received at the output port is modified in phase to substantially compensate for optical phase distortions arising from the optical phased matrix array.

Preferably, the transfer functions are implemented in the form of a series of lookup tables relating the level of each the pixel to the phase variation each the pixel introduces to light from the optical signal which is incident thereon.

Preferably, the transfer functions further include substantial compensation for the optical phase distortion arising from the overall optical system.

Preferably, the optical system further includes an optical dispersion means for spatially separating wavelength signals from the optical signal.

Preferably, the method further includes the steps of:
 (c) determining a further transfer function relating the wavelength signals to the pixels they are incident thereon; and
 (d) associating selected ones of the pixels in accordance with the transfer function to the wavelength signals such that the phase of selected wavelength signals can be independently modified in accordance with requirements.

Preferably, the optical system includes a plurality of output ports and the method further includes the steps of:
 (e) determining a plurality of routing transfer functions relating the coupling between the input port and the output ports; and (f) controlling the level of selected ones of the pixels in accordance with the routing transfer functions such that at least a fraction of selected ones of the wavelength signals is directed to at least one of the output ports.

Preferably, the method further includes the steps of:
 (g) determining a further transfer function relating the optical power of the wavelength signals that is coupled to optical output ports adjacent the desired output port to the amplitude and phase imparted to the wavelength signals due to multiple reflections in the optical system; and
 (h) modifying the routing transfer functions to substantially cancel the optical power on the adjacent output ports.

Preferably, the optical system further includes a plurality of input ports.

Preferably, the method is utilized in a testing phase by testing selected regions of the optical phased matrix array.

Preferably, the optical phased matrix array is a liquid crystal spatial light modulator.

Preferably, the optical phased matrix array is a liquid crystal on silicon spatial light modulator.

In accordance with a second aspect of the present invention, there is provided an optical system including: an optical input port for projecting an input optical signal onto an optical phased matrix array, an optical phased matrix array including a plurality of individually addressable pixels thereon, each pixel being drivable within a prescribed range of levels, an optical dispersion means for spatially separating wavelength signals from the optical signal, an optical output port for collecting a predetermined fraction of the optical signal received from the optical phased matrix array; there is provided a method of selecting a desired one of the wavelength signals including the steps of:
 (a) determining a transfer function relating the wavelength signals to the pixels they are incident thereon; and
 (b) associating selected ones of the pixels in accordance with the transfer function to the wavelength signals such that the phase of the selected wavelength signals can be independently modified in accordance with requirements.

Preferably, the wavelength signals are standardized wavelength bands designated for telecommunications networks.

Preferably, the wavelength signals are designated by spacings of one of 200 GHz, 100 GHz, 50 GHz, 25 GHz, or 12.5 GHz.

Preferably, the pixel associations are reconfigurable according to requirements.

Preferably, the pixels in a selected region of the optical phased matrix array are associated with wavelength signals separated by a particular spacing and other pixels in other selected regions of the optical phased matrix array are associated with wavelength signals separated by different spacings according to requirements. Preferably, the particular spacing and the different spacings are each selected from the group of 200 GHz, 100 GHz, 50 GHz, 25 GHz, or 12.5 GHz.

Preferably, the transfer function is implemented in the form of a lookup table relating wavelength signal to the pixel each wavelength signal is incident thereon.

In accordance with a third aspect of the invention, there is provided an optical system including: an optical input port for projecting an input optical signal onto an optical phased matrix array, an optical phased matrix array including a plurality of individually addressable pixels thereon, each pixel being drivable within a prescribed range of levels, and a plurality of optical output ports, each for collecting a predetermined fraction of the optical signal received from the optical phased matrix array; there is provided a method of minimizing variations in the fractional signal collected by the output ports including the steps of:
  (a) determining a plurality of pixel transfer functions relating the level of each pixel to the phase variation each pixel introduces to light from the input optical signal which is incident thereon;
  (b) determining a plurality of routing transfer functions relating the coupling between the input port and the output ports;
  (c) determining minimum and maximum levels of the phase variation; and
  (d) controlling the level of selected ones of the pixels in accordance with a corresponding routing transfer function where the routing transfer function is constrained between the minimum and maximum levels such that such that at least a fraction of the optical signal is directed to at least one of the output ports and variations in the fraction of light collected by the output port is minimized.

Preferably, the routing transfer functions are substantially insensitive to variations in the pixel transfer functions. More preferably, the minimum and maximum levels are reconfigurable to adjust for variations in the pixel transfer functions.

In accordance with a third aspect of the invention, there is provided an optical system including: an optical input port for projecting an input optical signal onto an optical phased matrix array, an optical phased matrix array including a plurality of individually addressable pixels thereon, each pixel being drivable within a prescribed range of levels, an optical output port for collecting a predetermined fraction of the optical signal received from the optical phased matrix array, a plurality of pixel transfer functions relating the level of each pixel to the phase variation each pixel introduces to light from the input optical signal which is incident thereon, and at least one routing transfer function describing the phase variation to be imparted by selected ones of the pixels to thereby couple the fraction of the optical signal between the input port and the output port, where the routing transfer function is constrained between selected minimum and maximum levels; there is provided a method of minimizing time-varying variations including the steps of:
  (a) providing a detection means at the output port, with the detection means being responsive to time-varying variations in the fraction of the optical signal collected by the output port; and
  (b) modifying the maximum and minimum levels to substantially minimize the time-varying variations.

Preferably, the optical system further includes a plurality of optical output ports, each output port including a corresponding detection means, and a plurality of routing transfer functions to couple selected fractions of the optical signal between the input port and at least one selected output ports in accordance with requirements.

In accordance with a fourth aspect of the invention, there is provided an optical system including: an optical input port for projecting an input optical signal onto an optical phased matrix array, an optical phased matrix array including a plurality of individually addressable pixels thereon, each pixel being drivable within a prescribed range of levels, an optical output port for collecting a predetermined fraction of the optical signal received from the optical phased matrix array, a plurality of pixel transfer functions relating the level of each pixel to the phase variation each pixel introduces to light from the input optical signal which is incident thereon, an optical dispersion means for spatially separating wavelength signals from the optical signal, a wavelength transfer function relating the wavelength signals to the pixels they are incident thereon to defined regions of pixels for independent modification of the wavelength signals, and at least one routing transfer function describing the phase variation to be imparted by selected the regions to thereby couple a fraction of the wavelength signal between the input port and the output port; there is provided a method of attenuating a selected fractional wavelength signal including the steps of:
  (a) determining a plurality of equalization transfer functions relating the phase variation of selected pixels in the selected region to the amount of attenuation achieved on a selected wavelength signal;
  (b) selecting a suitable equalization transfer function to give the required attenuation on a selected fractional wavelength signal; and
  (c) applying the selected equalization transfer function in conjunction with the routing transfer function to attenuate the fractional wavelength signal in accordance with requirements.

Preferably, the selected equalization transfer function causes the fractional wavelength signal to be directed away from the output port by a known distance thereby attenuating the light collected by the output port in accordance with requirements. More preferably, the selected equalization transfer function causes a selected portion of the fractional wavelength signal to be directed away from the output port thereby attenuating the light collected by the output port in accordance with requirements. Even more preferably, the selected equalization transfer function modifies the phase of selected portions of the wavelength signal such that the modified portions destructively interfere with other portions of the wavelength signal by a known amount thereby attenuating the amount of light collected by the output port in accordance with requirements.

Preferably, the optical system includes a plurality of output ports and step (b) further includes selection of an equalization transfer function for attenuation of a selected wavelength signal that does not cause a significant fraction of the optical signal to be collected by another of the optical output ports.

In accordance with a fifth aspect of the invention, there is provided an optical system including: at least one optical input port and at least one optical output port; a liquid crystal spatial light modulator including a plurality of individually addressable pixels thereon; wherein the input port delivers an optical input signal comprising of a plurality of wavelength signals to the liquid crystal spatial light modulator and wherein the modulator couples the optical signal to the output port; there is provided a method of calibrating the optical system including the steps of:
  (a) performing a background calibration of the spatial light modulator and the optical system; and
  (b) performing an efficiency calibration to optimize the coupling of a selected portion of the optical input signal between the input port and the output port as a function of wavelength; such that the pixels of the spatial light modulator can be operated as a dynamically reconfigurable grid.

Preferably, the background calibration of step (a) includes analysis of wavefront distortions and optical aberrations of at least the spatial light modulator. More preferably, the background calibration further includes the correction of wavefront distortions and aberrations by appropriate modification on a pixel-by-pixel basis of the wavefront of light that impinges on the spatial light modulator.

Preferably, the method results in a plurality of tabulated coefficients describing at least one of:

(i) the optical phase response of the individual pixels of the spatial light modulator;

(ii) a plurality of holographic phase modulation functions, which when applied to the pixels of the spatial light modulator, provides directional control of light which is incident on the pixels to couple the light between an input port and an output port of the optical system; and (iii) a plurality of phase variation functions for control over the coupling efficiency of the light between the input port and the output port.

Preferably, the method further includes a plurality of transfer functions to reconstruct the phase variation functions from the tabulated coefficients in accordance with requirements.

Preferably, the tabulated coefficients describing the optical phase response includes temperature specific information.

Preferably, the calibration method is a self-calibration method.

Preferably, the phase variation functions are formed from a holographic phase function.

Preferably, step (b) of the method includes the steps of:

(b1) performing a calibration of the phase retardance response to an optical signal of the spatial light modulator on a pixel-by-pixel basis; and (b2) performing a calibration of the dispersion characteristics of the optical signal with respect to one axis of the spatial light modulator.

More preferably, the data obtained from step (b1) is retained and reprocessed using the results of step (b2).

Preferably, the optical system includes a plurality of optical output ports and step (c) of the method includes the steps of:

(c1) determining a further plurality of tabulated coefficients and transfer functions to couple a required fraction of the optical signal to each of the output ports;

(c2) determining a plurality of first modification functions to modify the transfer functions of step (c1) to substantially account for non-uniformity across the surface of the spatial light modulator for each the output port; and (c3) determining a second modification function to modify the transfer functions of step (c1) to substantially minimize the effect of cross-talk on adjacent ones of the output ports.

Preferably, the spatial light modulator is a liquid crystal spatial light modulator. More preferably, the spatial light modulator is a liquid crystal on silicon spatial light modulator.

Preferably, the plurality of phase holograms and the plurality of phase variation function are substantially insensitive to variations in the response of the spatial light modulator.

Preferably, the optical system includes a detection means at the output port to monitor variations in the response of the spatial light modulator.

BRIEF DESCRIPTION OF THE FIGURES

Further features and advantages of the present invention will become apparent from the following detailed description of preferred embodiments of the invention, taken in combination with the appended drawings in which.

DESCRIPTION OF PREFERRED AND OTHER EMBODIMENTS

The preferred embodiment of the current device is a reconfigurable optical wavelength processor for use in telecommunications network applications. The optical processor uses a liquid crystal SLM (preferably a LCoS SLM) as an optical phased-matrix coupling device to couple selected wavelength channels contained in at least one optical input signal to at least one output port. The input and output ports, and the particular wavelength channels coupled between them, are chosen as required for the routing of signals in the telecommunications network. To ensure that the device is adaptable over a range of possible network configurations, the SLM is implemented as a dynamically reconfigurable grid. The individual pixels in the grid each modify the phase (or wavefront) of an incoming input beam in such a way that the beam is directed efficiently to a desired output port.

A self-calibration technique is described where the calibration of the optical processor is performed after the device has been constructed. This enables the calibration to provide corrective capabilities for irregularities and aberrations arising from both the active SLM and the supporting optical system of lenses, mirrors, diffraction gratings etc. The wavefront distortions caused by these aberrations can be corrected by appropriate tailoring of the wavefront phase by the liquid crystal SLM.

Figure 1:
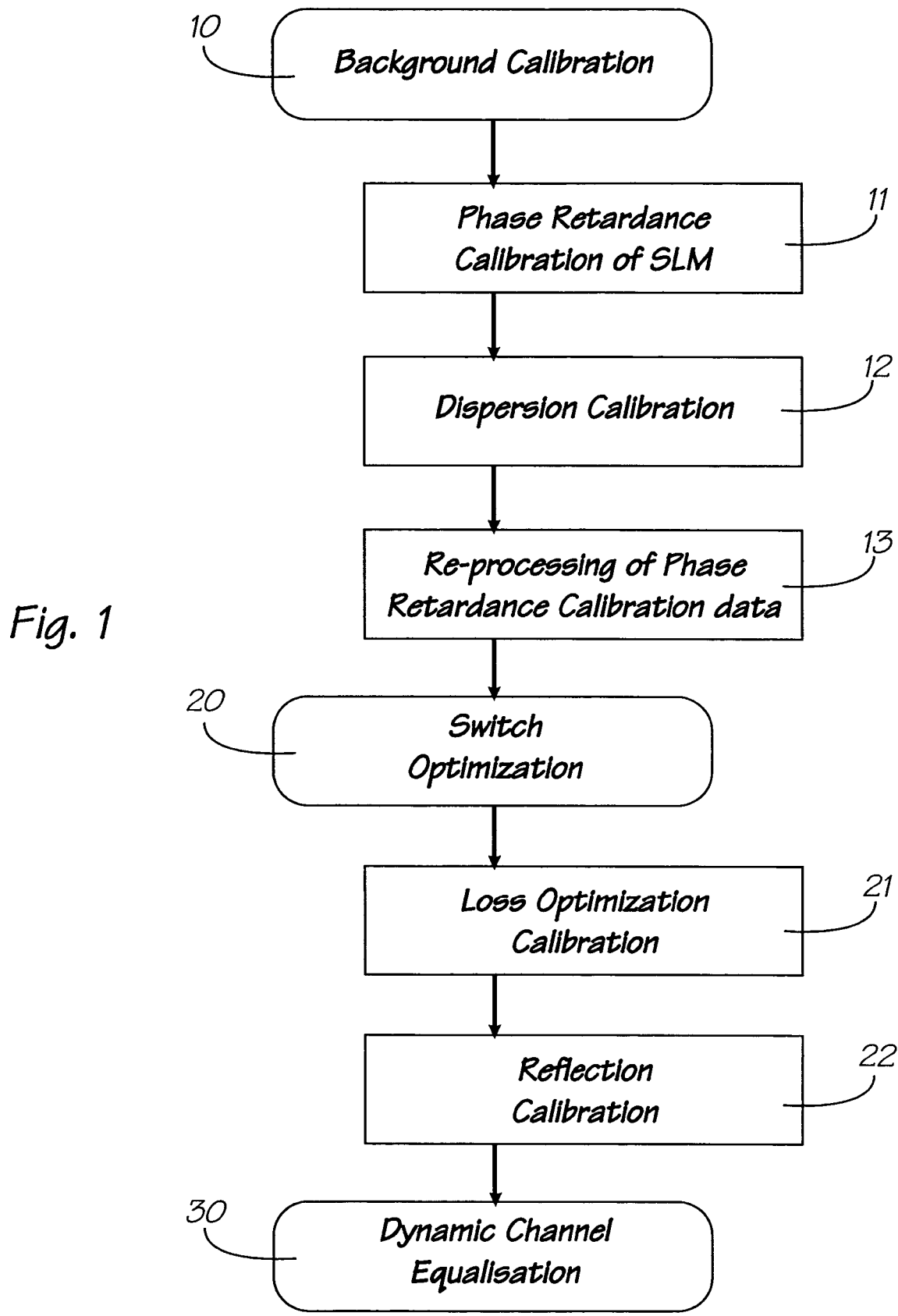
FIG. 1 is a method for calibrating an optical device including a liquid crystal SLM for use in optical telecommunications and networking applications.

The full calibration of the device involves a number of separate procedures as shown in FIG. 1, with each step including a number of calibrations:

a calibration of the background characteristics 10 of the SLM and the optical system;

a calibration 20 to optimize the switching functions of the optical processor; and calibration of appropriate dynamic channel equalization (DCE) functions 30 that can efficiently be applied for attenuation of a particular wavelength channel as required.

The first step in the background calibration 10 is a calibration of the phase retardance characteristics of the SLM 11. The aim of this calibration is to determine the response of a liquid crystal SLM to a voltage level across its individual pixels and the phase change imparted on to an incident beam of light of a given wavelength. This is necessary as the SLM invariably will have imperfections such as non-flat surfaces or non-uniform liquid crystal thickness across its face. The phase retardance calibration when complete will allow the SLM to be set such that the same phase change is applied to light striking any part of the SLM. The phase image provides a uniform background onto which subsequent phase functions can be added to perform the required switching operations. The phase retardance calibration is important to account for inhomogeneities in the SLM and present a situation where light impinging anywhere across the surface will undergo the same phase change.

The next step is a calibration of the dispersive characteristics 12 of the optical system in relation to the SLM. The optical system, in directing the light to the SLM, uses dispersion elements to separate out the wavelengths in the input signal and image them along one axis (subsequently referred to as the dispersion or x-axis) of the SLM. The dispersion calibration thus provides the necessary data to be able to select a particular wavelength (or group of wavelengths) and know which part of the SLM to modify in order to affect that wavelength. This can be used to identify and lock the pixels of the SLM to the ITU standardized wavelength channel designations for any choice of channel spacing. It is even possible to have multiple standardized grids incorporated in the same device, for example, part of the SLM can be configured to receive 100 GHz channels whilst different parts of the SLM can be configured to receive 50 GHz wavelength channels.

The particular channels can easily be reconfigured to the different standards dynamically as the network requirements evolve.

The relationship between the wavelength of light and the SLM pixel that the wavelength is incident on is, to a first approximation, a simple linear function ranging between the initial and final wavelengths of the design region (in this case the telecommunications bands) mapped to the SLM pixels in the dispersion axis. However, this ideal case does not usually occur in practice, since the dispersion of the optical system is typically not uniform. Therefore, since the phase retardance calibration 11 relies on wavelength information, the results of the dispersion calibration are used to reprocess the data (13) and provide an accurate background image on the SLM.

The phase retardance and dispersion calibrations 11 and 12 are necessary to generate a starting position from which to add functionality to the device. To perform the required functions, ie the switching of particular wavelength channels from at least one input port to one of a number of output ports, a number of further calibrations are advantageous. These calibrations would primarily be directed to ensuring optimization of the switching functions with regard to parameters such as total light throughput on a target output port, cross-talk between output ports, and the extinction ratio between adjacent wavelength channels or the noise floor.

The main switch optimization (20) calibration functions are:

a loss optimization calibration 21; and a reflection calibration 22.

Starting from the uniform background phase profile from the phase retardance and dispersion calibrations, the phase function for each switching operation is of the form $$\phi(x,y,p)=\phi_{lin}(x,y,p)+\phi_{quad}(x,y,p)+\phi_{refl}(x,y)$$

where x and y are positional indicators for each pixel on the SLM, p is a parameter used to indicate the desired output port, $\phi_{lin}(x,y,p)$ and $\phi_{quad}(x,y,p)$ are linear and quadratic phase functions (derived from linear and quadratic coefficients m(x, p) and k(x,p) respectively from the loss optimization calibration procedure) of the phase ramp, and $\phi_{refl}(x,y)$ is a reflection phase function which is a sinusoidal modulation derived from the reflection calibration. The pixel index x corresponds to pixels along the x-axis or dispersion axis described above and the pixel index y corresponding to pixels along the orthogonal y-axis. The y-axis is referred to as the switching plane as it is along this axis that a particular phase ramp is applied to the SLM in order to switch light of a particular wavelength $\lambda_n$, and direct it to the desired output port, p.

The next aspect of the calibration process that may be considered is concerned with dynamic channel equalization (DCE) of the wavelength channels. While state-of-the-art optical communications technology provides optical amplification with extremely uniform gain across the DWDM channels, very small insertion loss variations within any component can result in much larger power variations between channels in a long fiber-optic link. Also, polarization-dependent gain and loss effects can cause time-dependent power variations between channels. Therefore, it is necessary to be able to dynamically adjust the attenuation characteristics of the wavelength channels in response to these power variations. In order to maintain uniform transmission quality across all DWDM channels in optical telecommunications systems, DCE is used to equalize these sources of time, temperature and channel-count dependent insertion loss variations. DCE functions can also be used to selectively control output power for any pass-through channel, or to attenuate or block a channel completely on any or all of the output ports.

DCE calibration is required since there are a vast number of possible DCE functions available, some of which may be suitable for a small subset of wavelength channels and output ports but not for some other subset, or may only be suitable for a particular range of attenuation. Thus, a library of DCE functions is usually required, along with a calibration table to indicate which DCE function is suitable for a particular wavelength channel being output to a particular port with a certain amount of attenuation.

The phase functions that are used to define the switching functions of the optical processor are primarily a holographic phase ramp function for directional control of the individual wavelength channels. Added to this directional phase function is a number of phase variation functions (not necessarily including the DCE functions) designed primarily to reduce the optical power coupled to particular output ports. The phase variation functions can be optimized for the target port and provide attenuation of the optical power in a particular wavelength channel, or reduction of cross-talk on any of the other output ports. The variation functions can be designed such they are:
  continuous along the full length of the ramp in the switching axis; or
  repetitive or constrained within a known period eg between the resets of a modulus function.

Figure 28:
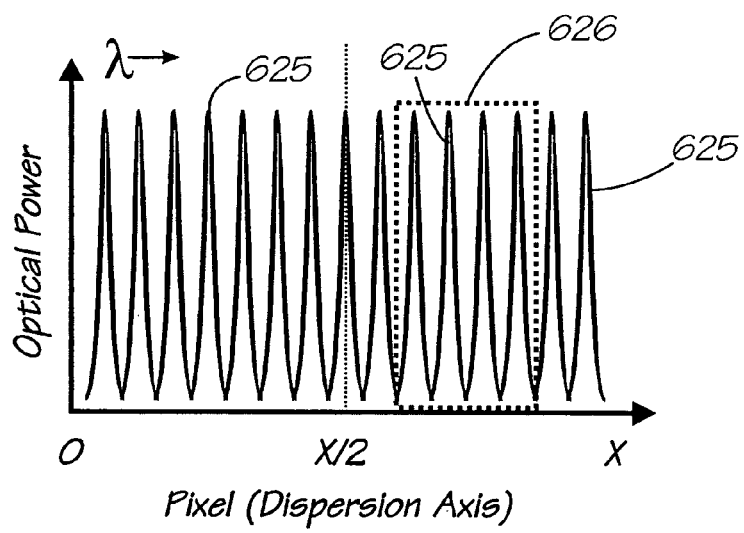
FIG. 28 shows the typical optical power distribution on the SLM of a particular wavelength channel in the dispersion axis.
Figure 29:
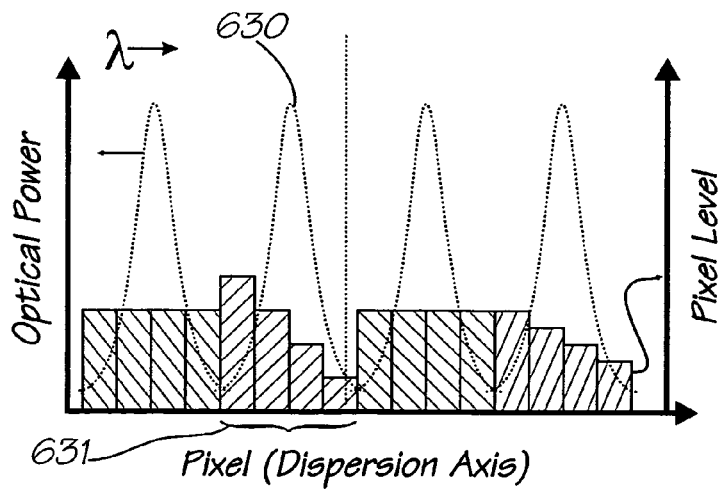
FIG. 29 shows an expanded view of a few wavelength channels and the SLM pixel levels for directional control of particular channels in the dispersion axis.

Since each of the wavelength channels typically is incident on between 3-6 pixels of the SLM along the dispersion axis, the variation functions can also be designed to operate along that axis for a particular channel (refer to FIGS. 28 and 29 and later discussion thereof).

Figure 2:
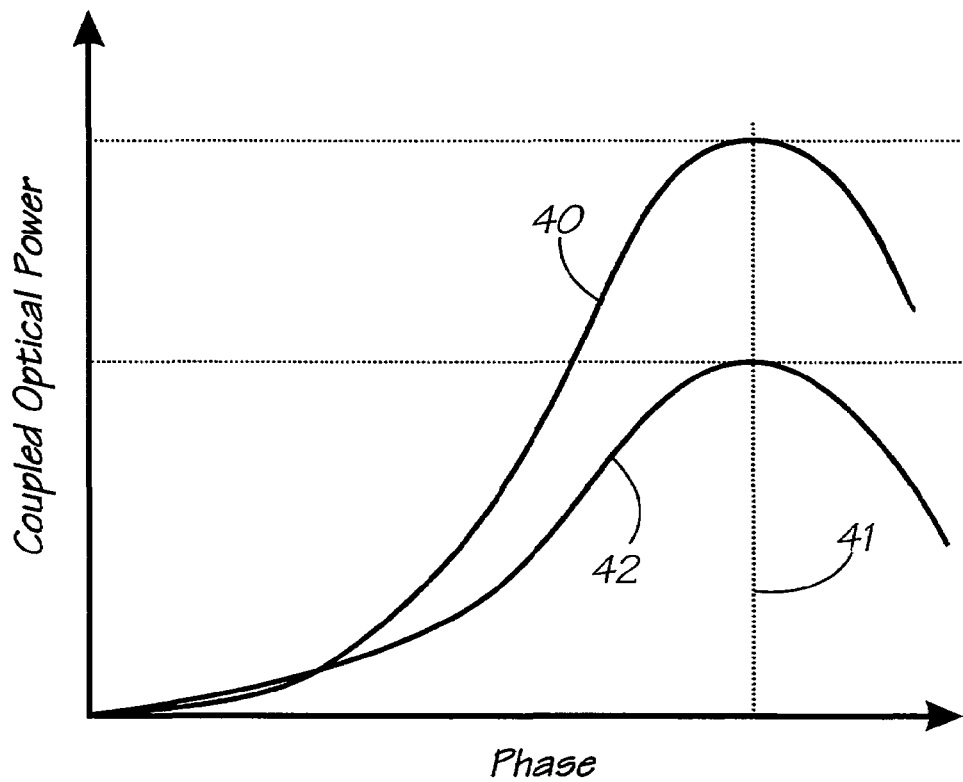
FIG. 2 is a graph showing a typical output power response curve with respect to phase change imparted on the light in the optical device by the liquid crystal SLM for switching and dynamic channel equalization operations.

The calibration methods described also provide long-term operational stability of the optical processor. To achieve this, the phase functions for the switching operations are designed such that small variations in the phase response of the liquid crystal SLM have little or no effect on the phase imparted to the incident light. The phase image functions are designed to minimize the sensitivity to absolute phase. FIG. 2 shows a graphical representation of this. The optical power coupled between an input and an output port is dependent on the phase shift imparted by the pixels of the liquid crystal SLM (line 40). The calibration process aims to find these phase functions where, when confined between minimum and maximum phase levels $\phi_{min}$ and $\phi_{max}$, the sensitivity of the coupled optical power to the phase is minimal. $\phi_{min}$ and $\phi_{max}$ define a phase value $\Phi_{opt}$ (41) ($=\phi_{max}-\phi_{min}$) which is usually chosen to be about $2\pi$ radians, however, benefits of choosing a smaller operating range can be identified, for example, faster switching times. Next, the calibration process determines the optimum form of the holographic phase functions that, when constrained between the limits of $\phi_{min}$ and $\phi_{max}$, facilitates the switching operations of the optical device without affecting the coupling efficiency. The addition of DCE functionality to the phase holograms attenuates the optical power and thus alters the phase response as seen by curve 42. The DCE functions however may advantageously be chosen such that they retain the relative insensitivity to absolute phase response.

Figure 3:
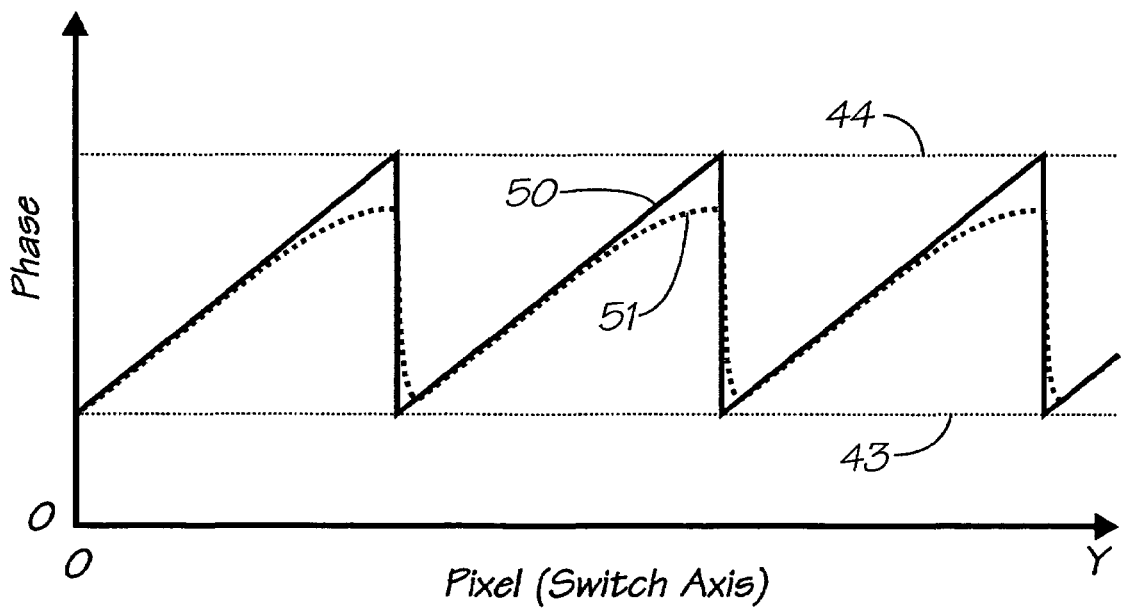
FIG. 3 is a typical phase hologram used for switching light between optical ports of the optical device.

FIG. 3 shows an example phase hologram switching pattern 50 for a simple switch operation. The hologram is constrained between $\phi_{min}$ (43) and $\phi_{max}$ (44) to give a modulus function. In the unlikely event that the phase response of the liquid crystal SLM changes over time ($\Phi_{opt}$ changes) it is possible that the change will be nonlinear with respect to the applied voltage. This could result in a phase hologram similar to 51 as opposed to the ideal hologram 50. If this occurs, the device may exhibit a time-varying modulation of the optical output coupled into the output ports, at the frequency of the alternating drive voltage applied to the pixels. This effect is commonly referred to as flicker and is due to increased sensitivity of the liquid crystal to absolute phase. To correct for this, $\phi_{min}$ and $\phi_{max}$ can be automatically adjusted relative to the change in $\Phi_{opt}$ such that the device retains its overall insensitivity to absolute phase and therefore extending its useable lifespan.

The long-term stability can be improved further by including other techniques such as closed loop monitoring of the phase response. This monitoring can be done whilst driving the pixel voltage at a particular frequency, and then modifying the phase functions to minimize the flicker at that frequency, thus locking the calibration to the optimum phase insensitive function.

A further modification in the phase retardance and dispersion calibrations can be added by considering the response of the optical device as a function of temperature. The optical device in use will typically be required to function efficiently within a range of predetermined operating temperatures. These temperatures are dictated by relevant Standards documentation and typically lie within a range of about 0° C. to about 70° C. however these limits can be more extreme depending on the particular application.

Within this range of operating temperatures, the phase response of the liquid crystal SLM can vary significantly. Also, other effects such as thermal expansion of optical elements within the device can also affect the optical alignment or introduce wavefront distortions as the light passes through the optical elements of the device.

To counter for these effects, the device can be heated in a controlled manner and the calibration procedures described above can be repeated, thus generating a number of calibration functions for each temperature, say in steps of 5° C. or 10° C., which can be called on as necessary. In this case the optical processor includes a temperature sensor in order to determine the calibration data required.

It can readily be appreciated that, in order to accurately characterize the liquid crystal SLM for all situations, there is a requirement to store a very large amount of data. This data is intrinsic to each individual SLM and the particular optical irregularities and peculiarities of each individual optical device. It is not practical to store massive library files for every individual device. Due to the switching speeds required for a reconfiguration of the network (typically <100 ms but possibly as quick as 10 ms), device specific calibration data is advantageously stored in the memory of the control circuitry for each individual device. The difficulty arises in that this memory capacity is limited due to space and processing requirements. Thus, it is advantageous to have a method of fully characterizing, with minimal data, an optical device including a SLM with a large number of individually addressable pixels, and identifying an algorithm that uses this data to accurately reconstruct a phase image on particular regions of the SLM device to perform the required operations of the optical processor.

Thus, to keep the amount of data characterizing the optical device to a minimum, in the preferred embodiment, the calibration data is not stored on a pixel-by-pixel basis for every possible configuration. Instead, the calibration process produces a series of tables containing calibration coefficients that define a series of image functions. These functions describe the appropriate images to be applied to the SLM to achieve a particular routing or switching operation. The calibration also contains suitable algorithms which take the information in the tables and generates the phase image on the SLM as required.

Phase Retardance Calibration

Figure 4:
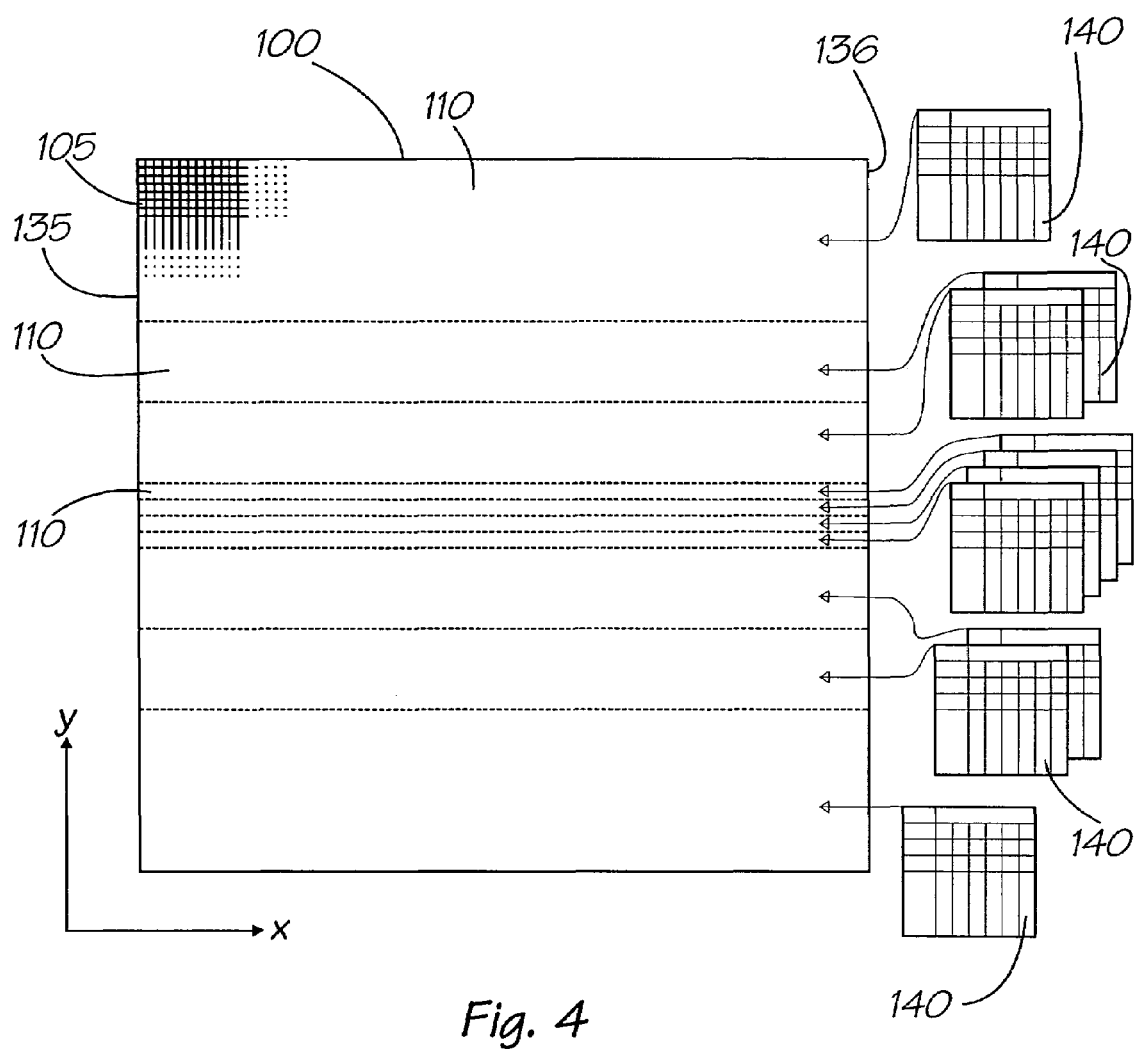
FIG. 4 shows a plurality of calibration tables each describing a region of a liquid crystal spatial light modulator.

The purpose of this calibration is to determine, on a pixel-by-pixel basis, a range of grey levels that can be used to impart a minimum phase change as required to light impinging on the SLM within a particular operating wavelength range. FIG. 4 shows schematically a liquid crystal SLM 100 which has individually addressable pixels e.g. 105 on its surface. The pixels each are driven to one of a number of grey levels to modify the light incident on that pixel. The level is determined according to the voltage difference between a transparent indium-tin-oxide (ITO) (or similar) layer on the top surface of the SLM and the voltage applied to each particular pixel on the back surface. Using 8-bit coding and suitable voltages, it is assumed that each pixel can be driven to one of 256 levels (designated as levels 0-255). The actual voltages corresponding to each level is determined by the SLM control circuitry and is not dealt with directly in this calibration. Each of the 256 gray levels imparts a phase change to light passing through the cell.

The SLM is divided into a number of regions 110 in the switching axis. These regions are used in order to characterize different parts of the SLM individually. In regions where most of the energy in the light strikes the SLM, a number of closely spaced apertures for fine characterization are used. Towards the edges, where the energy in the beam is less intense, the regions can be spaced further apart and interpolation routines used to approximate for intermediate pixels.

Figure 5:
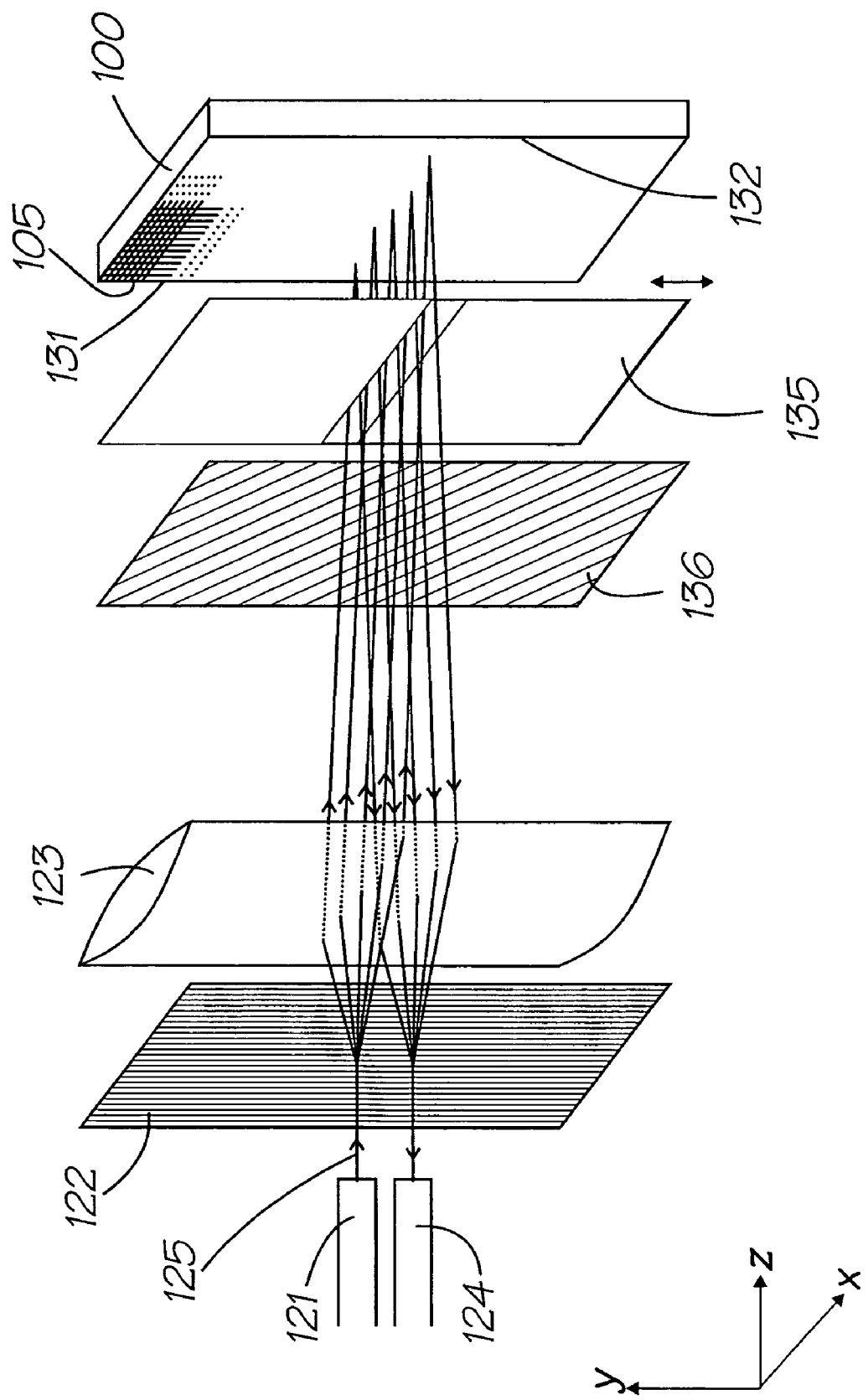
FIG. 5 shows a perspective view of an optical layout for calibration regions of a spatial light modulator.

The optical system used to calibrate the SLM is shown in FIG. 5 and includes an input port 121 to deliver light to the SLM, a dispersion element 122 to separate the incident light with respect to its wavelength, and a series of lenses and mirrors 123 to direct the light to the SLM. The optical system also includes an output port 124 for collecting and monitoring the light after being processed by the SLM. The optical input signal 125 used for the calibration process is a broadband source containing wavelengths within the operating regime of the SLM (for DWDM applications, this is typically between 1535 and 1565 nm). The configuration of the optical system used causes the light to be dispersed in the x-axis (shown in FIGS. 4 and 5). This axis will be referred to as the dispersion plane of the system.

Light from the broadband source is first delivered to the SLM where it is reflected to the output port 124 and the optical signal (specifically the loss in dB at the output port) is monitored on an optical spectrum analyzer (OSA). The light source used is typically an amplified spontaneous emission (ASE) source giving light in the region of interest. The output signal is referenced to the known characteristics of the ASE source to give a relative loss measurement. A tunable laser source and detection system can be used instead of the white light source and OSA combination to illuminate the SLM and hence obtain more precise and accurate data.

The dispersion of the optical system is designed such that the beginning of the wavelength range of interest strikes the SLM near one edge 131 and the maximum wavelength strikes near the other edge 132 along the x-axis. In this manner it is possible to extract information about each of the individual pixels in the x-axis as a function of wavelength. In the first instance, it is assumed that the wavelength is a linear function between one edge of the SLM and the other edge. This ideal situation however does not occur in practice (this is addressed by the dispersion calibration described below), therefore, it is advantageous that the data obtained from this phase retardance calibration is processed at least twice; first with a linear function relating the pixels along the dispersion axis to a wavelength, and secondly with a calibrated pixel to wavelength function.

The beam striking the SLM from each wavelength channel is an elongate Gaussian beam with its major axis along the y-axis of the optical system. This axis will also be referred to as the switching axis.

To define the regions (110 of FIG. 4) during the calibration procedure, a slit 135, oriented along the x-axis, is placed in front of the SLM to only allow the light to impinge onto, and be reflected from, a particular region. The width of the slit is typically about 500 μm; however, it can be larger or smaller depending on the optical throughput and the signal to noise ratio at the output port. The slit is either manually or electronically moved upwards in the y-direction across the face of the SLM and the calibration performed at each stop position corresponding to a particular region 110. Since the beam intensity near the edges (in the y-axis) is low, the apertures describing these regions can be constant functions. This has little effect on the efficiency of the calibration and has the benefit of reducing the data storage requirements of the final calibration information. A linear polarizer 136 aligned at 45° is also used in front of the slit 135 to analyze the polarization of the light reflected from the SLM 100.

Figure 6:
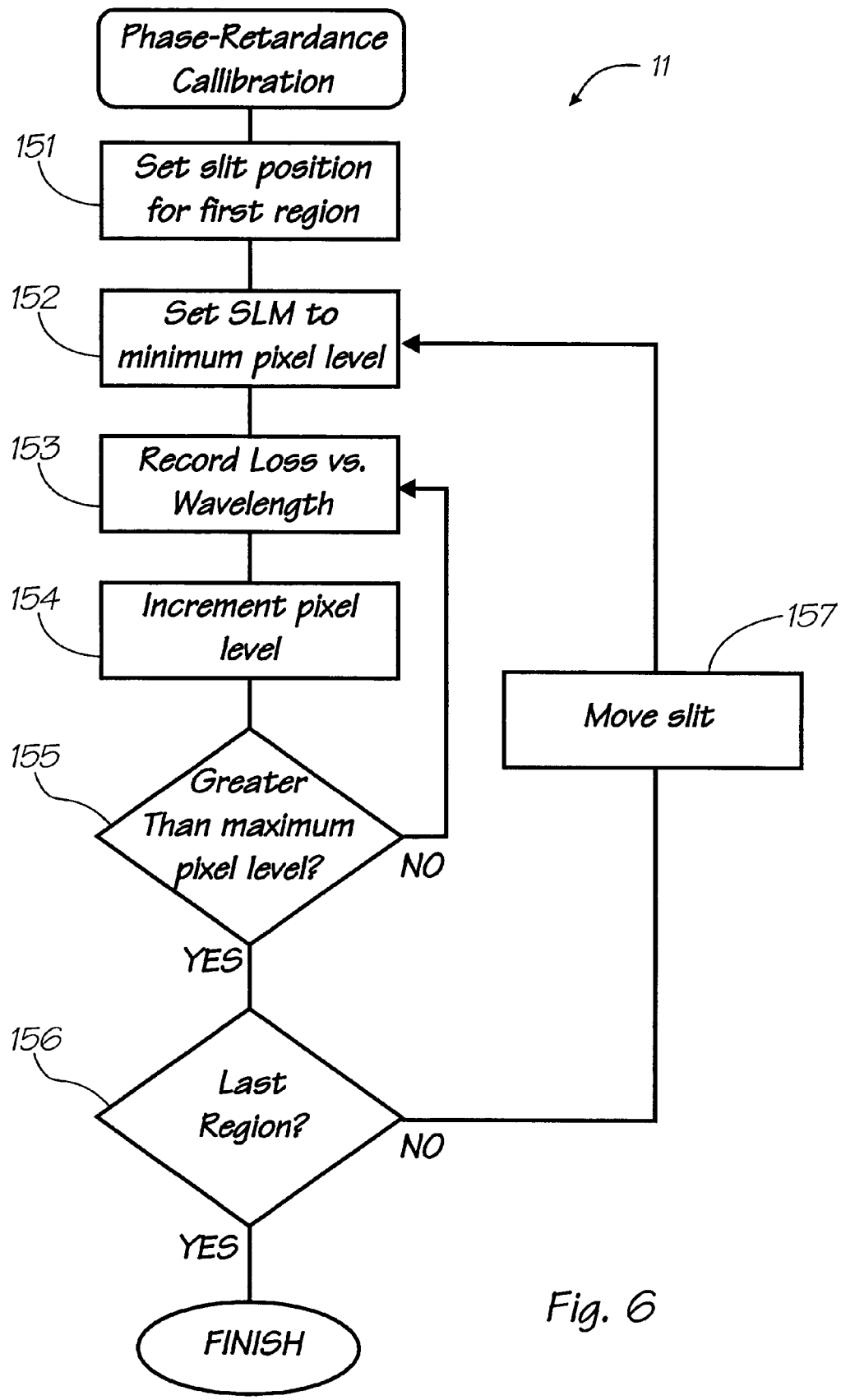
FIG. 6 is a method for calibrating the phase retardance characteristics of a liquid crystal SLM using the optical layout of FIG. 5.

The steps in the method for recording the data for the phase retardance calibration is shown in FIG. 6. The slit is placed in position for the first region (110 of FIG. 5) to be measured in step 151 and all the pixels on the SLM are set at the minimum gray level in step 152. The optical loss as a function of wavelength is then recorded (153) using an optical spectrum analyzer or similar means and the pixel level is incremented by one (1) at step 154. The loss is recorded for all pixel levels (steps 153 to 155) and repeated for each region.

Figure 7:
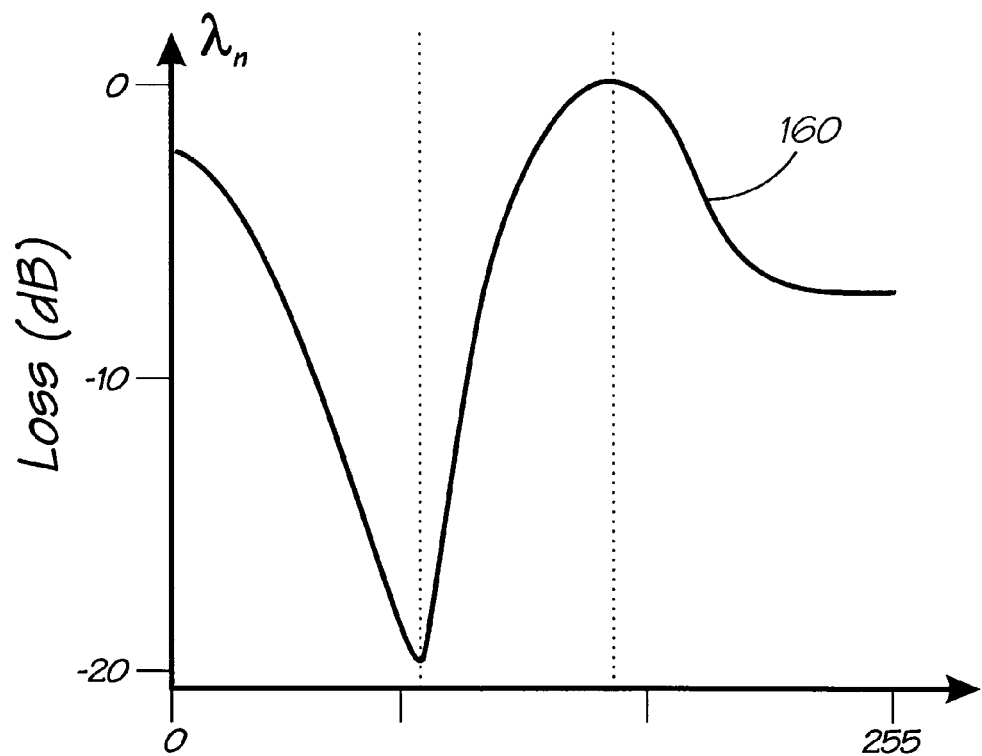
FIG. 7 shows a typical graph of optical loss at a known wavelength as a function of pixel level on a liquid crystal SLM obtained from the phase retardance calibration.

The procedure of FIG. 6 results in a table of data (represented schematically as 140 in FIG. 4) which records the optical loss for every wavelength as a function of the grey level applied to the pixels of the SLM. A similar table is generated for every region used in the calibration. For each region, the loss as a function of pixel level for each wavelength of interest (for example corresponding to the center wavelengths of optical channel contained in a DWDM signal) is extracted from the corresponding table. This gives a series of data plots (a typical plot 160 is shown in FIG. 7), with each corresponding to a particular wavelength channel $\lambda_n$.

Figure 8:
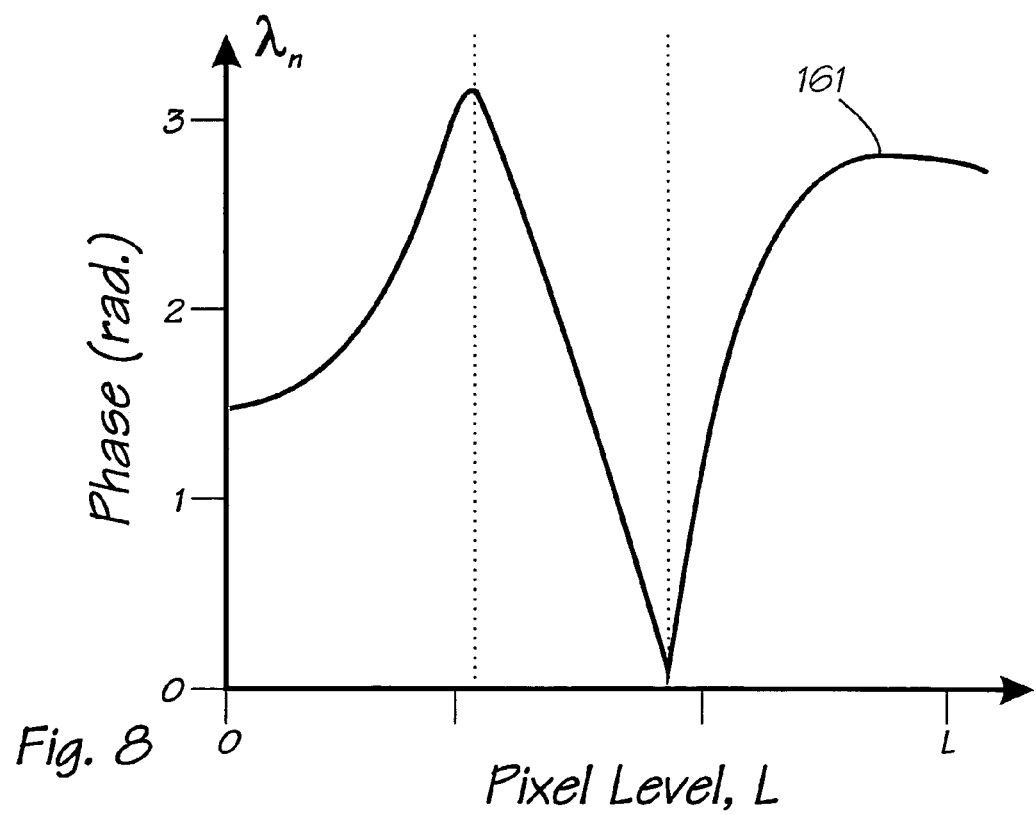
FIG. 8 shows a typical graph of relative phase response of a liquid crystal SLM derived from the graph of FIG. 7.

The amount of loss recorded in the optical signal is proportional to the phase change imparted to the light by the pixels of the SLM and this is depicted in the raw Phase-to-Pixel Level relationship 161 of FIG. 8. There is again a plurality of data curves similar to 161 corresponding to the phase change imparted to each wavelength channel $\lambda_n$ by the SLM.

Figure 9:
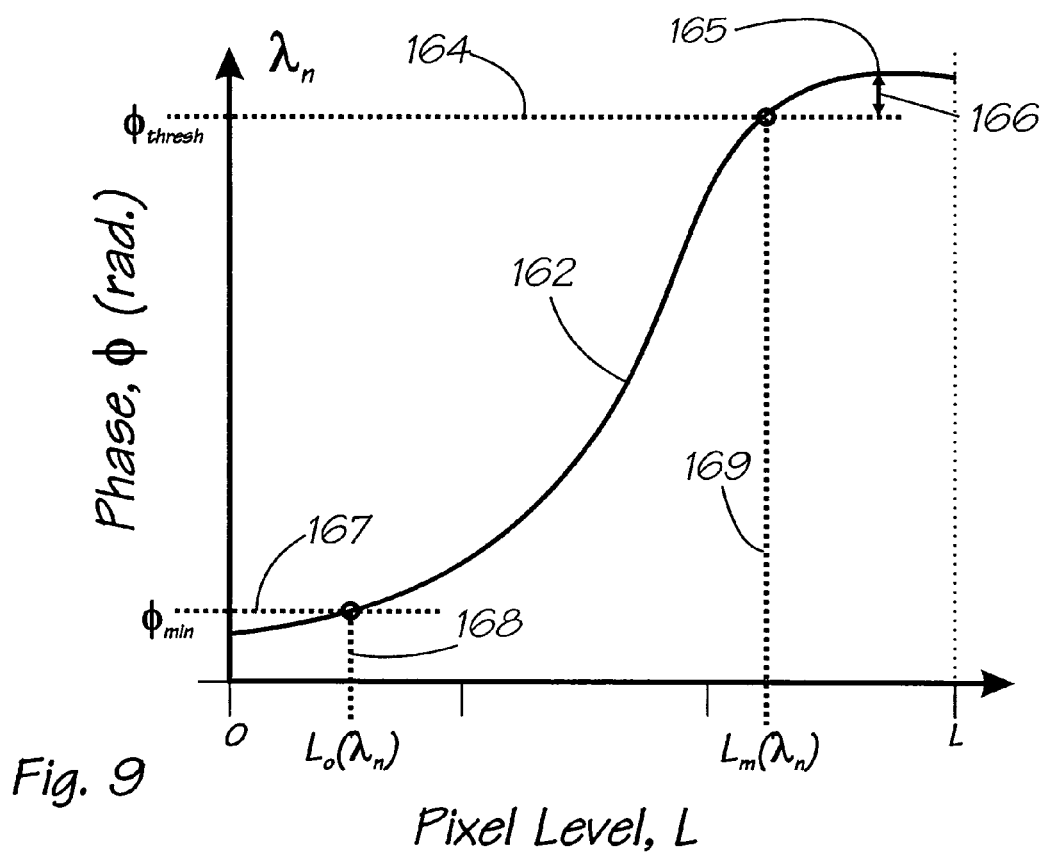
FIG. 9 shows a typical graph of absolute phase response derived from the graph of FIG. 8 and the choice of the maximum and minimum phase levels for a particular wavelength.

The raw phase change 161 can be "unwrapped" to obtain a smooth curve 162 of relative phase change such as that shown in FIG. 9. This data curve 162 can now be used to generate a known phase change to a beam of light (at that particular wavelength $\lambda_n$) by applying the corresponding gray level to the relevant pixels of the SLM.

The maximum phase threshold 164 for each wavelength, $\phi_{thresh}(\lambda)$, is determined by first finding the maximum phase in the corresponding Phase vs. Pixel Level data plot (at point 165). Since the rate of change in the phase ($\Delta\phi$) with respect to pixel level L (ie $\Delta\phi/\Delta L$) is quite small in the region near the maximum, $\phi_{thresh}(\lambda)$ is thus taken to be the phase at the maximum minus an arbitrary constant 166. This constant is typically on the order of 0.2 radians.

The minimum phase threshold, $\phi_{min}(\lambda)$ 167, is found in a similar fashion where the arbitrary constant is chosen sufficiently large to ensure that $\phi_{min}(\lambda)$ is above the noise floor that occurs at low levels (usually corresponding to high pixel level drive voltages).

Figure 10:
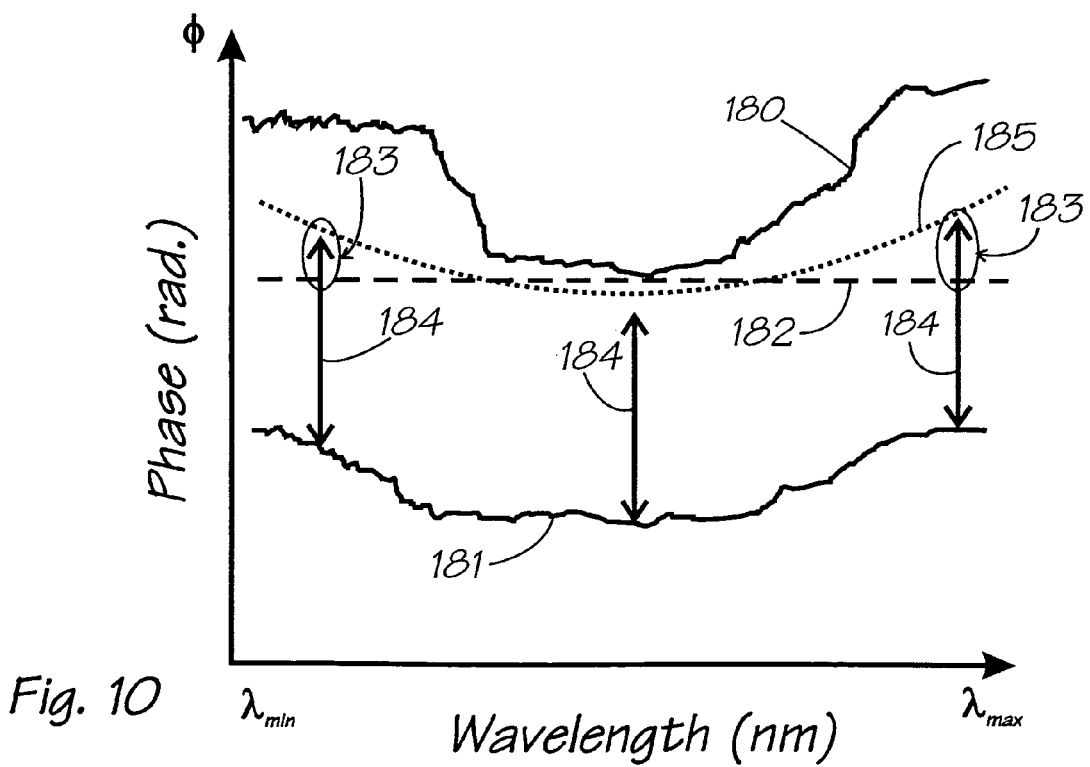
FIG. 10 shows a typical graph of the maximum and minimum phase levels obtained for all wavelengths of interest.

FIG. 10 shows plots of typical values of $\phi_{thresh}(\lambda)$ (180) and $\phi_{min}(\lambda)$ (181) plotted with respect to wavelength. To minimize the number of discontinuous phase jumps between adjacent pixels in the image on the SLM (which result in multiple unwanted diffraction orders in the reflected beams), the maximum threshold $\phi_{max}(\lambda)$ is defined as straight line 182. This also permits the amount of data to be stored in the final calibration to be significantly reduced. However, it may be advantageous to the operation of the SLM to be able to generate a phase change of between zero and about $2\pi$ for every wavelength of interest ie, $$\phi_{thresh}(\lambda) - \phi_{min}(\lambda) \geq 2\pi.$$

Figure 11:
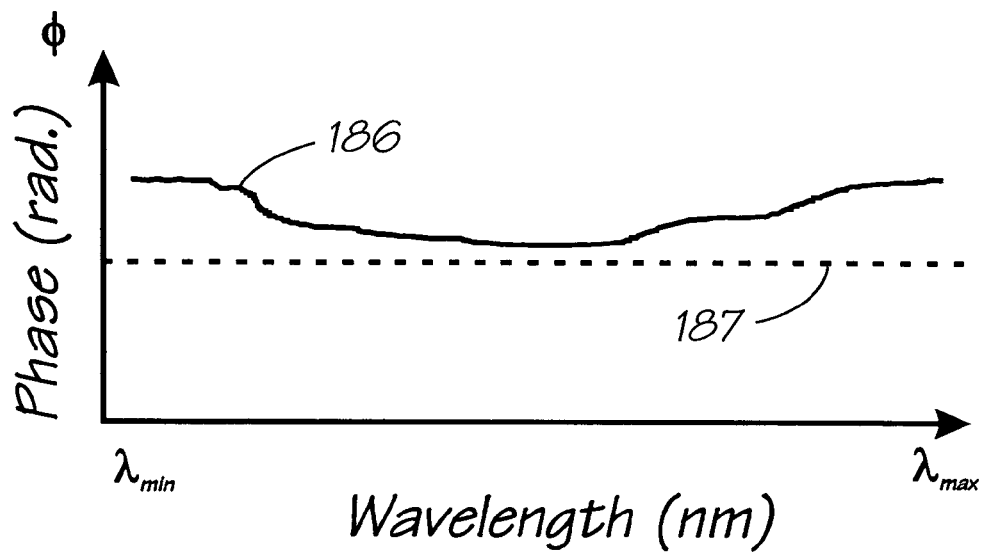
FIG. 11 shows a typical graph of the available liquid crystal SLM phase response for all wavelengths derived from the graph of FIG. 10.

Depending on the particular SLM being calibrated, a situation can occur where the maximum phase $\phi_{thresh}(\lambda)$ does not give a large enough phase change over the entire wavelength range due to issues such as non-flatness or thickness non-uniformities of layers of the SLM. An example of this occurring is seen in FIG. 10 at 183 (the length of arrows 184 corresponds to a phase change of $2\pi$). To correct for this, a function $\phi_{max}(\lambda)$ (185) is defined that gives a sufficient phase change over all wavelengths. This function 185 is defined with a smooth curvature to avoid large phase jumps between adjacent pixels which causes scattering of the reflected light. By subtracting $\phi_{min}(\lambda)$ 181 from $\phi_{max}(\lambda)$ 185 the available phase change 186 (shown in FIG. 11), that the SLM can access as a function of wavelength is found. In practice, the minimum phase change requirement 187 for all wavelengths is usually selected to be slightly larger than $2\pi$ (say, for example, $2.2\pi$) to allow for possible degradation in the SLM response over time.

Figure 12:
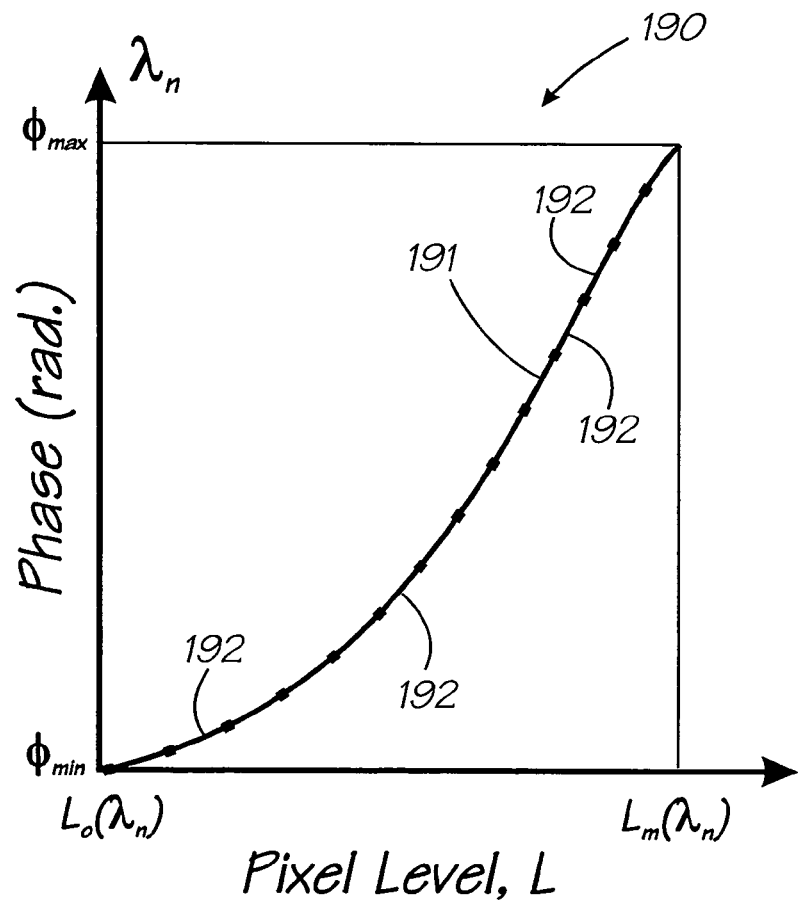
FIG. 12 shows a typical calibration curve for a particular wavelength obtained from the phase retardance calibration.

Referring back to the individual phase to level data plots (FIG. 9) for each individual wavelength channel, the data is truncated at pixel levels $L_o(\lambda_o)$ (168) and $L_m(\lambda_n)$ using the $\phi_{min}(\lambda)$ (181 of FIG. 10) and $\phi_{max}(\lambda)$ functions (185 of FIG. 10) to give a data plot similar to 190 shown in FIG. 12 for each wavelength channel $\lambda_n$.

A curve fitting function 191 is applied to the data to obtain a smooth Phase-to-Level function for each wavelength. Example functions that can be chosen for the fit are multiple-order polynomial, Gaussian, sin(x)/x or other similar functions where the chosen function is the one which gives the best fit to the curve. The curve fitting function is then broken into a piecewise linear function describing the Phase-to-Level relationship. Interpolation of the appropriate linear segment is used to calculate the pixel level for the desired phase. It is found that the piecewise linear function with 17 or 18 linear sections 192 gives only a small error in the Phase-to-Level conversion compared with a multiple-order polynomial or other fitting function. More or fewer linear sections 192 can be used as necessary considering the data storage capability of the device and the accuracy requirements of the final calibration.

The above procedure is then repeated for each of the regions used to characterize the different areas of the SLM and the data for each region is stored in a multi-dimensional lookup table. This calibration table includes a number of 'pages', where each page corresponds to a calibration region of the SLM (i.e. each region 110 of FIG. 4). On each page is recorded the phase thresholds and coefficients characterizing the piecewise linear functions that describe the Phase to Level relationship (similar to that depicted in FIG. 12) for each of the wavelength channels $\lambda_n$. The gray level that each individual pixel needs to be set at to give a desired phase change can then found by interpolation from these functions.

After the calibration over all regions is finished, the data for each step is stored, and used in the calibration of the dispersion characteristics of the device as described below. The initial measurement data (ie the optical loss as a function of wavelength) is stored at this stage as well since it is advantageous to re-process this data using the results of the dispersion calibration. This is to obtain a more accurate phase retardance calibration that can be obtained by using the linear Pixel-to-Wavelength assumption in the first instance.

Now, for a certain phase change required at a particular wavelength, the level for each individual pixel is calculated by interpolation of the piecewise linear function corresponding to that wavelength. This repeated for all of the regions used to characterize the cell, thus resulting in a phase profile across the SLM for the pixels corresponding to that wavelength channel.

Dispersion Calibration

This calibration aims to accurately determine the relationship between the wavelength (or frequency) of light striking the SLM and the pixel value along the dispersion axis. That is, it provides the necessary data to be able to select a particular wavelength (or group of wavelengths) and know which part of the SLM to modify in order to affect that wavelength. This can be used to identify and lock the pixels of the SLM to the ITU standardized wavelength channel designations for any choice of channel spacing. The linear first order approximation used in the initial processing of the phase retardance calibration is necessary since the results of that calibration are required to obtain an accurate calibration of the dispersion characteristics.

As before, light from a white light source is delivered to the SLM and reflected to a known output port which is monitored on an OSA. In this case however, selected groups of pixels across the face of the SLM in the dispersion axis, each of about 3 or 4 pixels wide are activated such that the light striking those pixels is dropped from the monitored output port. The spacing between the pixel groups is varied depending on the resolution desired. About 20 to 30 groups across the SLM are usually adequate. The center pixel of each group is recorded. This channel index can be an integer or a floating point number between zero and the maximum number of pixels (for example 256 or 512), depending on the number of pixels activated in each group.

Figure 13:
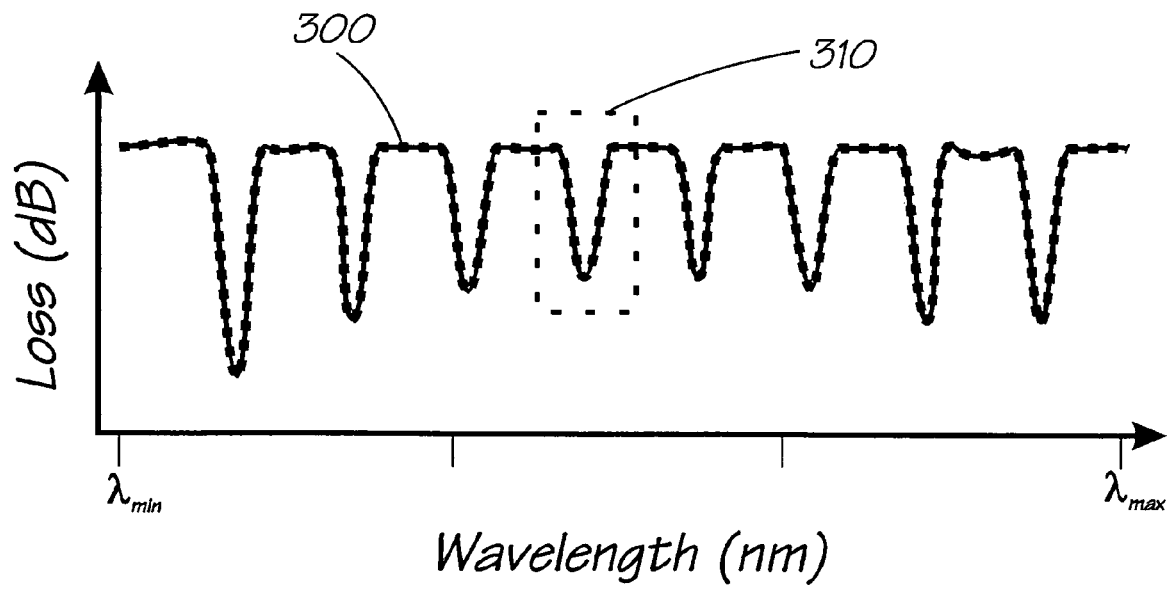
FIG. 13 shows a typical graph of optical loss as a function of wavelength for a comb signal used in the dispersion calibration.
Figure 14:
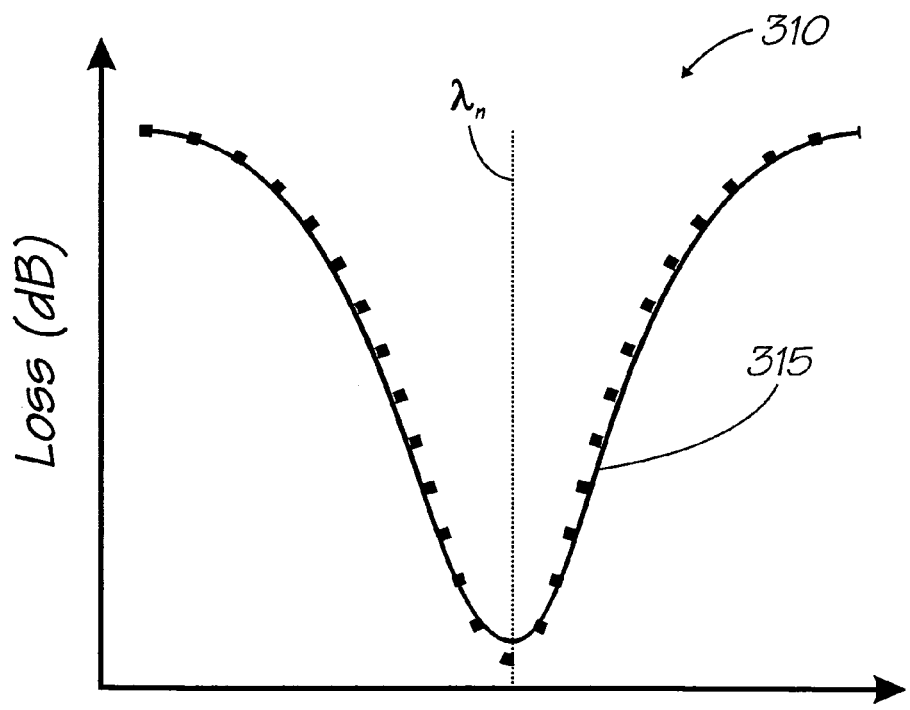
FIG. 14 shows an enlarged view of a particular wavelength channel from the graph of FIG. 13.
Figure 15:
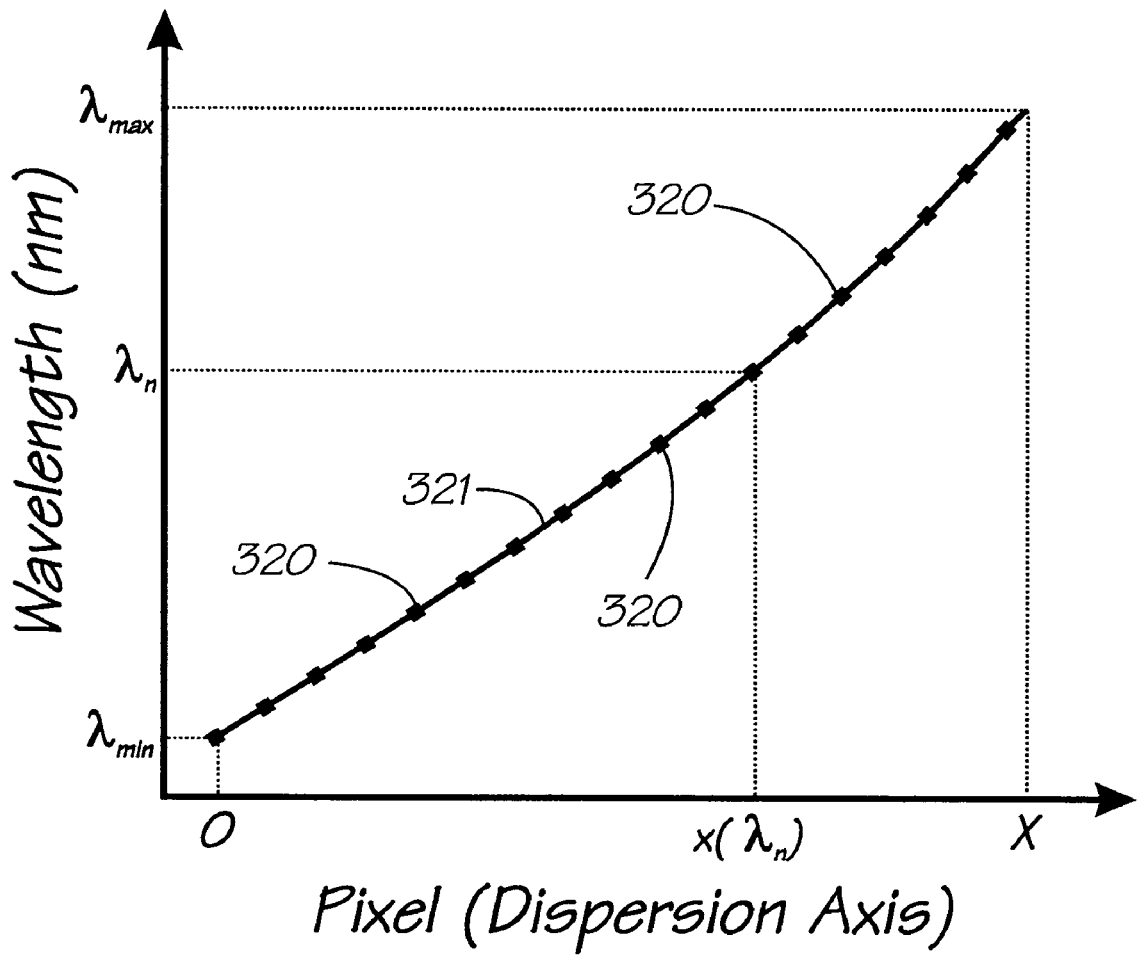
FIG. 15 shows a calibration function describing the wavelength and the pixel of incidence along the dispersion axis of the SLM.

The signal measured on the OSA at the monitored output port is a comb-like signal 300 in the wavelength range of interest ($\lambda_{min} - \lambda_{max}$) similar to that shown in FIG. 13. Each of the individual channels 310 is extracted as shown in FIG. 14 and analyzed separately by fitting the data to a suitable function 315 eg. a Gaussian or Lorentzian function. From the fitting parameters, the center wavelength (or frequency) of the channel is ascertained and plotted against the channel index recorded earlier for the corresponding group of pixels. This is depicted as data points 320 in FIG. 15 for an SLM with X pixels in the dispersion (x) axis.

The data 320 is next fitted to a multi-order polynomial function 321 so that the corresponding wavelength (or frequency) of each individual pixel can found by interpolation from the fitting function. This information is then stored as a 2-dimensional array which is then called upon to identify the pixel corresponding to the center of a desired wavelength band in subsequent calibrations and calculations. In particular, this calibration is used to re-process the data obtained from the phase retardance calibration described above.

Once the dispersion characteristics are known, the ITU standardized channel designations can be overlaid with the calibration and the corresponding SLM pixels locked to operate on the designated channels for a particular standard. The device can also be dynamically adapted to accommodate the standardized channel designations for a network operating with a different grid as required, or even to accommodate wavelength channels operating under different standard grids simultaneously eg a 100 GHz channel can coexist in a 50 GHz or 200 GHz network (provided of course that none of the wavelength channels overlap).

Loss Optimization Calibration

This calibration aims to determine the correct phase profile to apply to the SLM device in order to efficiently deliver a particular wavelength channel into a desired output port. It is used to optimize the loss for signals directed to each fiber by finding the exact displacement required for optimal transmission.

The phase profile which results from this calibration is of the form $$\phi_{LossOpt}(x,y,p) = \phi_{lin}(x,y,p) + \phi_{quad}(x,y,p)$$

and consists of the addition of a linear phase profile $\phi_{lin}(x,y,p)$ and a quadratic phase profile $\phi_{quad}(x,y,p)$ in the switching axis of the SLM. The phase profiles describe the phase that each individual pixel in the x and y axes of the SLM are driven to and thus direct light from an optical input port to any of the optical output ports p.

The linear phase profile has the form $$\phi_{lin}(x,y,p) = m(x,p) \cdot y$$

where $m(x,p)$ is the linear phase coefficient and y is the pixel index of the SLM in the switching plane.

The quadratic phase profile is introduced to compensate for the curvature error of the SLM surface and has the form $$\phi_{quad}(x, y, p) = k(x, p) \cdot \left[ y - \left( \frac{Y-1}{2} \right) \right]^2$$

where $k(x,p)$ is the quadratic coefficient, and Y is the total number of pixels used to generate the phase profile in the switching plane of the SLM. This form of the quadratic phase centers the quadratic profile in the center of the SLM where curvature of the top layer of the device is most likely to occur.

The loss optimization calibration procedure can be divided into two parts—Measurement and Data Analysis:

Measurement:
Create a phase profile image to apply to the SLM that is the sum of both a linear and a quadratic phase profile.
Measure the optical loss for light sent to a particular output port for each of the wavelength channels of interest using an OSA.
Repeat with a range of linear and quadratic coefficients centered around theoretical values derived from the geometry of the device.
Record all measurement data.

Data Analysis:
Extract Loss vs. Linear-Phase-Change for a fixed quadratic value at each wavelength.
Find optimum coupling efficiency (minimum loss) from the Linear-Phase by interpolation.
Repeat above for the full range of quadratic phase coefficients.
Find optimum coupling efficiency over the quadratic values at each wavelength by interpolation.

These procedures are then repeated for each wavelength for output on a specific output port, and then the entire process is repeated again for each of the output ports in the system.

Figure 16:
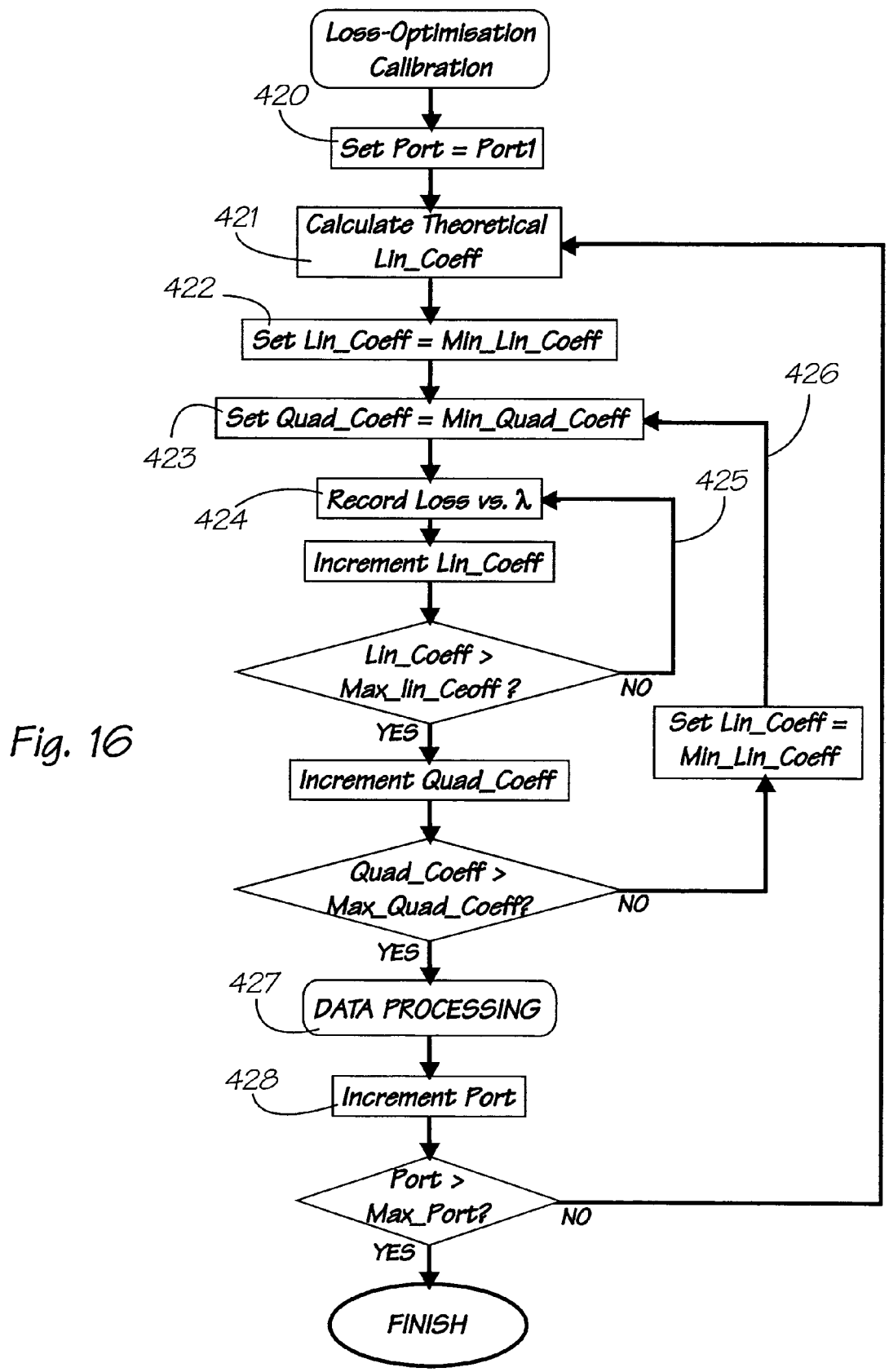
FIG. 16 is a method for determining the optimum switching functions of the optical device.

The overall loss optimization procedure is depicted in FIG. 16 where Port is the current output port, Lin_Coeff is the linear coefficient of the ramp function $\phi_{lin}$, and Quad_Coeff is the quadratic coefficient of the ramp function $\phi_{quad}$.

For each output port, 420, a linear phase profile is calculated 421 to deflect light to that port on reflection from the SLM. This phase ramp is described by a linear coefficient $m(x,p)$ 421. To find the linear coefficient to give the optimum coupling to the output port a range of values of $m(x,p)$ about the theoretical calculated value is generated (422). A range of quadratic coefficients $k(x,p)$ is also generated (423) and the optical loss as a function of wavelength is recorded (424). The optical loss is recorded as a function of wavelength for each value of $m(x,p)$ (425) and $k(x,p)$ (426). The data for this wavelength channel is then processed (427) (using the procedure outlined in FIG. 18). The procedure is then repeated for each output port or switch position required.

Figure 23:
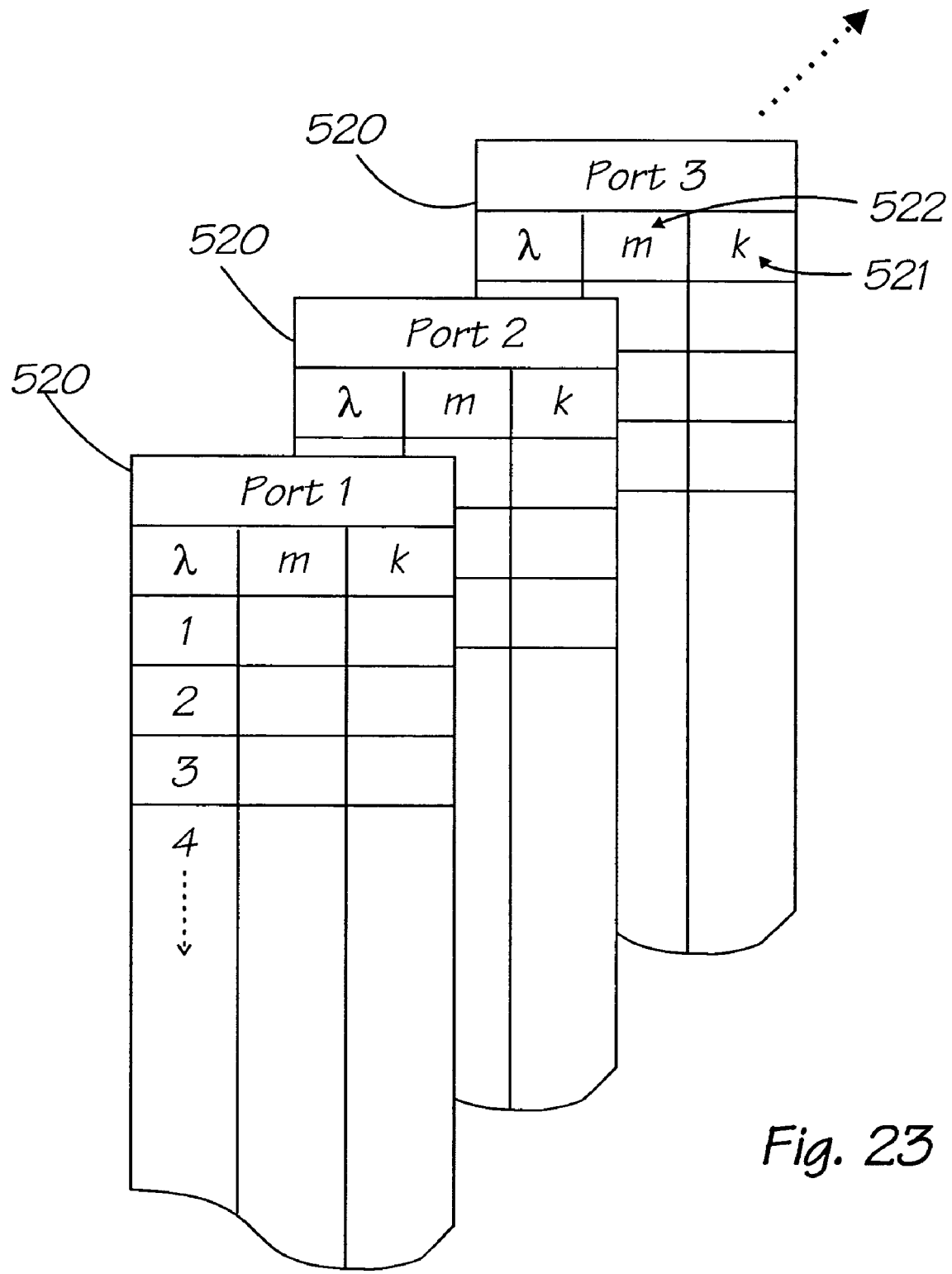
FIG. 23 shows a graphical representation of the calibration tables derived from the loss optimization calibration.

The results of the calibration are look-up tables (520 of FIG. 23) representing the optimum coupling efficiency as a function of wavelength channel for each optical output port. The parameters stored for this are the optimum linear and quadratic phase coefficients for maximum coupling as a function of wavelength for each output port.

Figure 17:
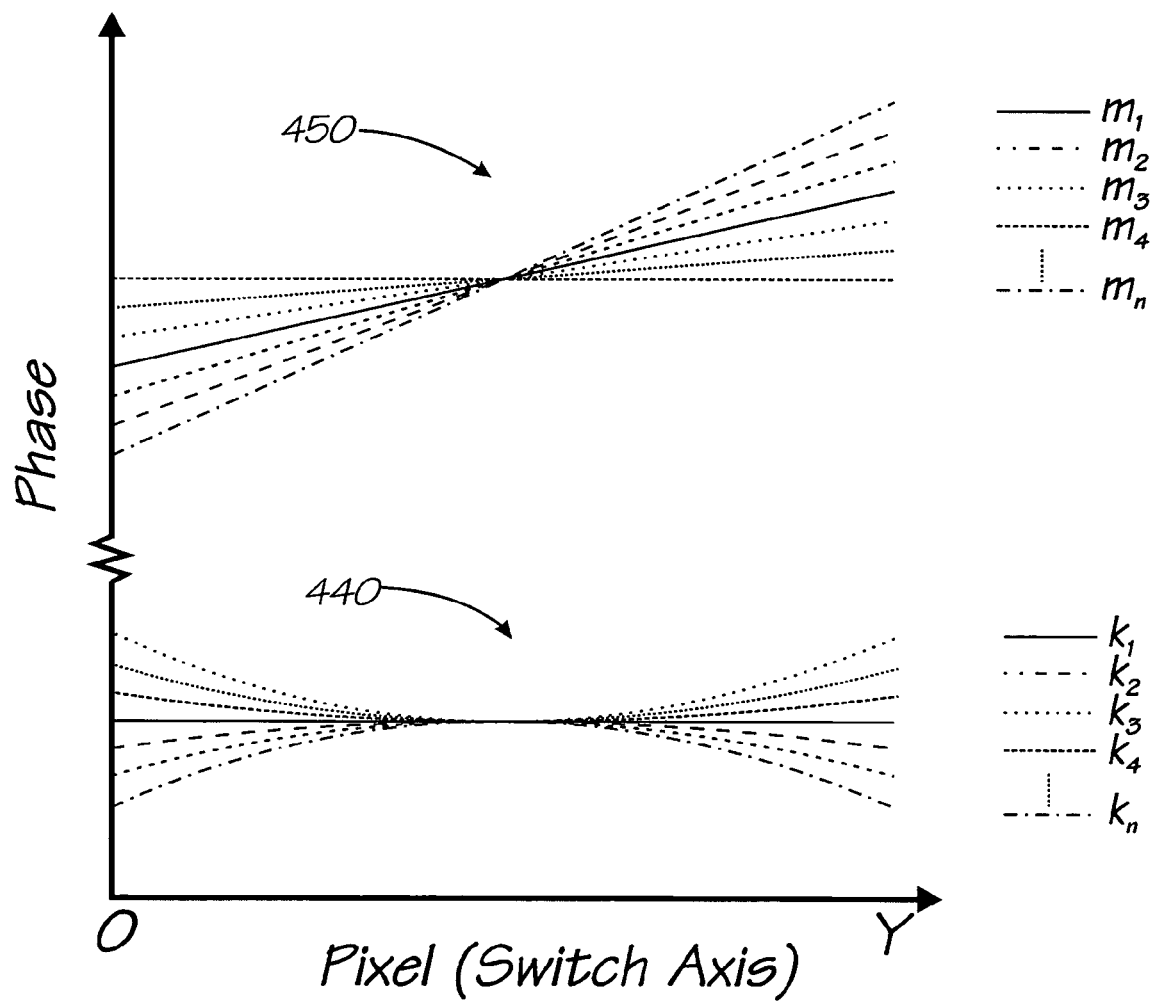
FIG. 17 shows a typical range of linear and quadratic switching functions used in the loss optimization calibration method of FIG. 16.

As can be appreciated, the measurement processes for this calibration technique results in the generation and analysis of a large amount of data. For each output port or switch position, the SLM has to be calibrated for each wavelength channel present in the input optical signal. Within each wavelength channel, the calibration process requires the generation of a number of quadratic phase profiles on the SLM (440 of FIG. 17) indexed by coefficients $k_1, k_2, k_3, \ldots, k_n$, and for each quadratic coefficient, the addition of the quadratic profile with a range of linear phase profiles (450 of FIG. 17) indexed by coefficients $m_1, m_2, m_3, \ldots, m_n$. Each data set is essentially a function describing the optical loss with respect to wavelength measured using an optical spectrum analyzer. Typically, the calibration will use about ten or eleven linear phase profiles and about the same number of quadratic profiles for each wavelength channel and port combination. More or less can, however, be used to improve accuracy or decrease the data handling requirements as necessary. This means that for each optical port output, the loss optimization data-space considered consists of 121 functions describing the optical loss with respect to wavelength.

Figure 18:
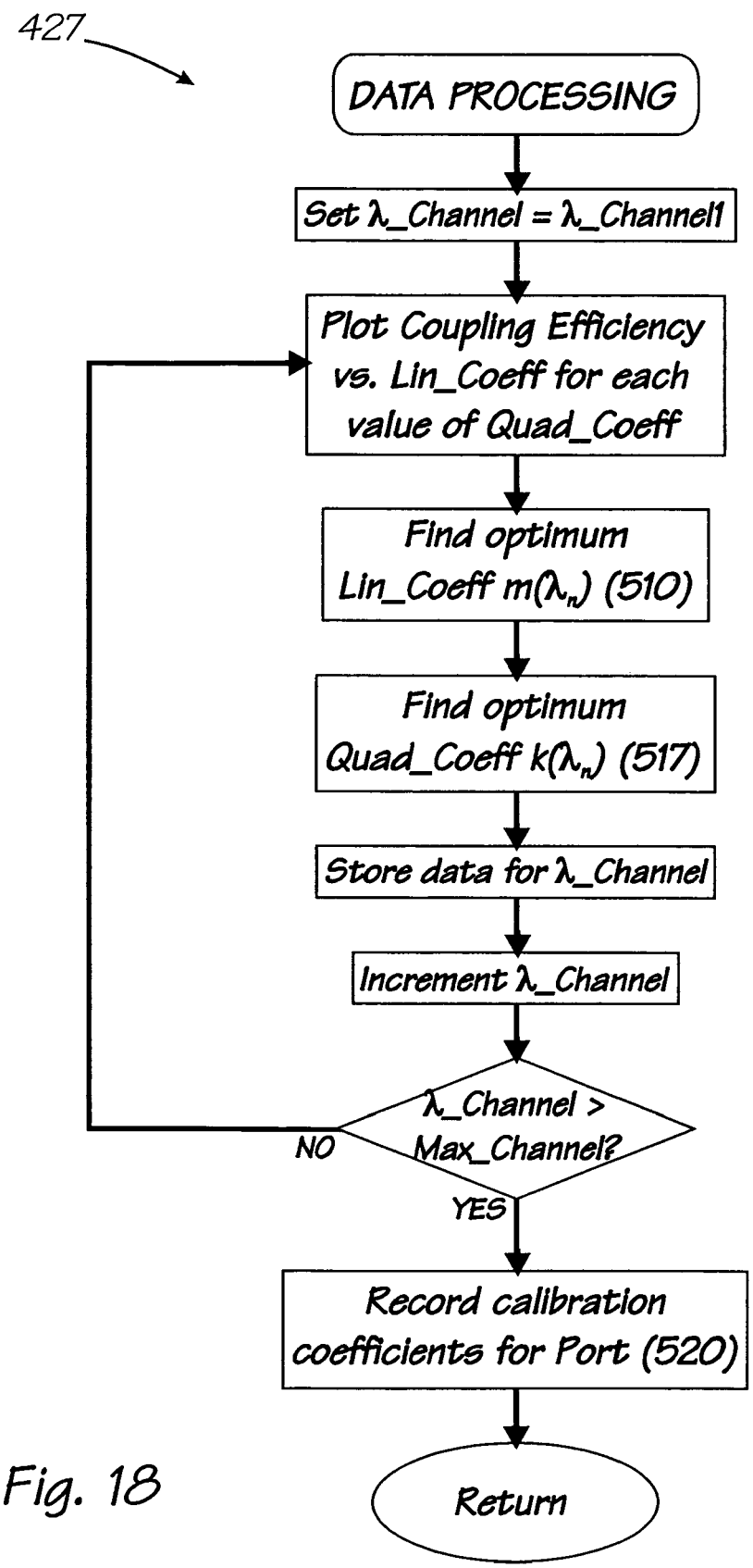
FIG. 18 is a method for processing the data obtained from the method of FIG. 16 to obtain the optimum parameters for the switching functions.
Figure 19:
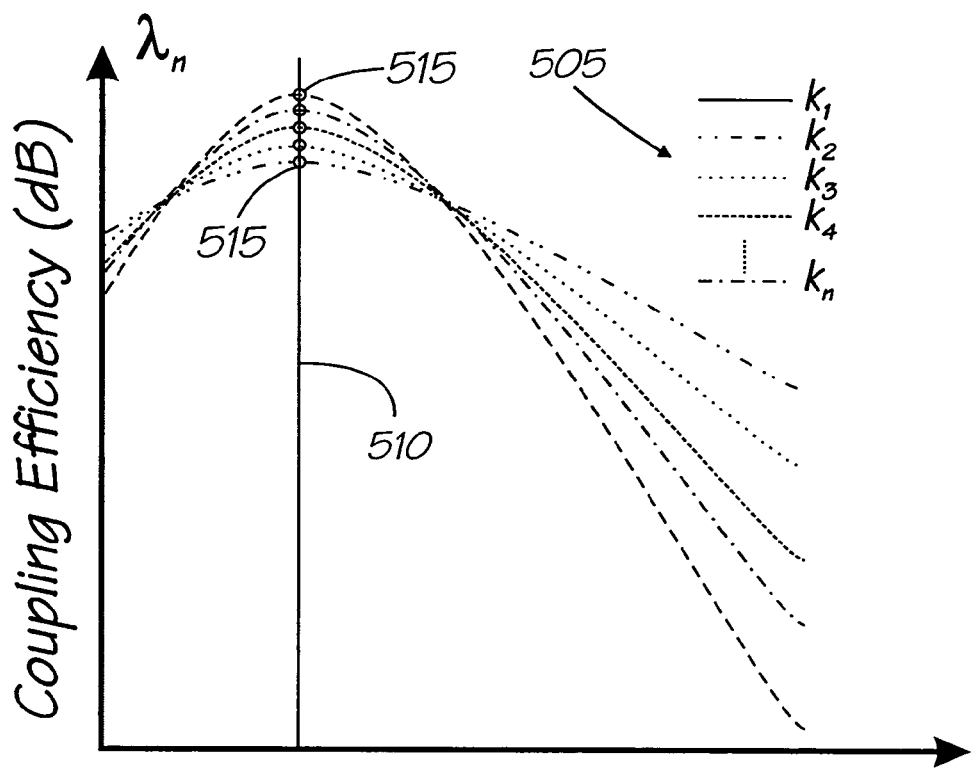
FIG. 19 shows a graph used to find the optimum linear phase coefficient in the method of FIG. 18.

The data processing stage outlined in FIG. 18 is the primary method for reducing the data handling requirements of the calibration function. It involves a number of calculations that performed after all of the data corresponding to a single output port has been acquired. Firstly, referring to FIG. 19, for each wavelength $\lambda_n$, a series of datasets 505 is generated corresponding to Loss vs. Linear-Phase-Coefficient curves, each indexed by the series of quadratic coefficients $k_1$–$k_n$. From this graph, the optimum linear phase coefficient (at line 510) can be determined. Similar figures are generated for successive wavelength channels $\lambda_n$ and the optimum linear phase extracted for each channel to generate the graph 511 shown in FIG. 20.

Figure 21:
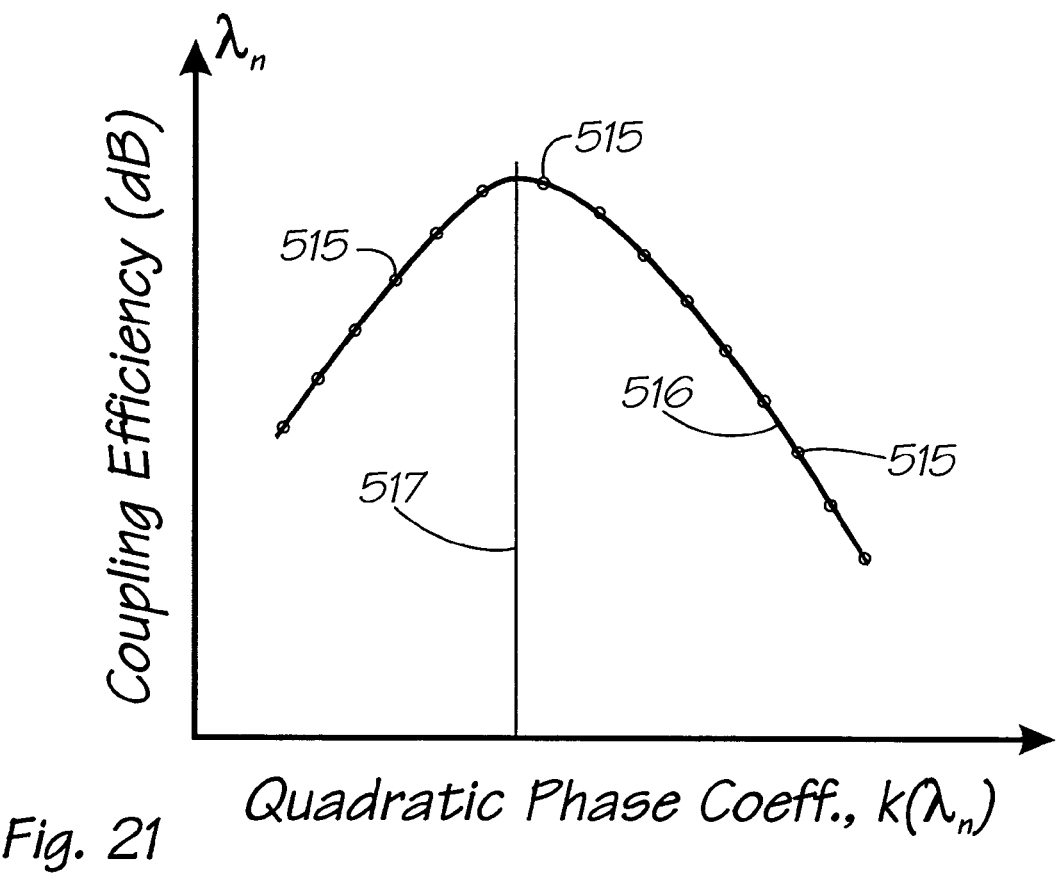
FIG. 21 shows a graph used to find the optimum quadratic phase coefficient in the method of FIG. 18.

Referring again to FIG. 19, to find the optimum quadratic phase coefficient, the loss at the intersection between line 510 and each of the individual datasets 505 is found (515) and plotted to give the graph shown in FIG. 21. A curve-fitting process is applied to the datum points 515 to give line 516, from which the quadratic phase coefficient resulting in the optimum coupling efficiency is determined (517). This process is again repeated for each of the wavelength channels $\lambda_n$ and the optimum quadratic phase coefficient is recorded with respect to wavelength 520 as shown in FIG. 22.

Figure 20:
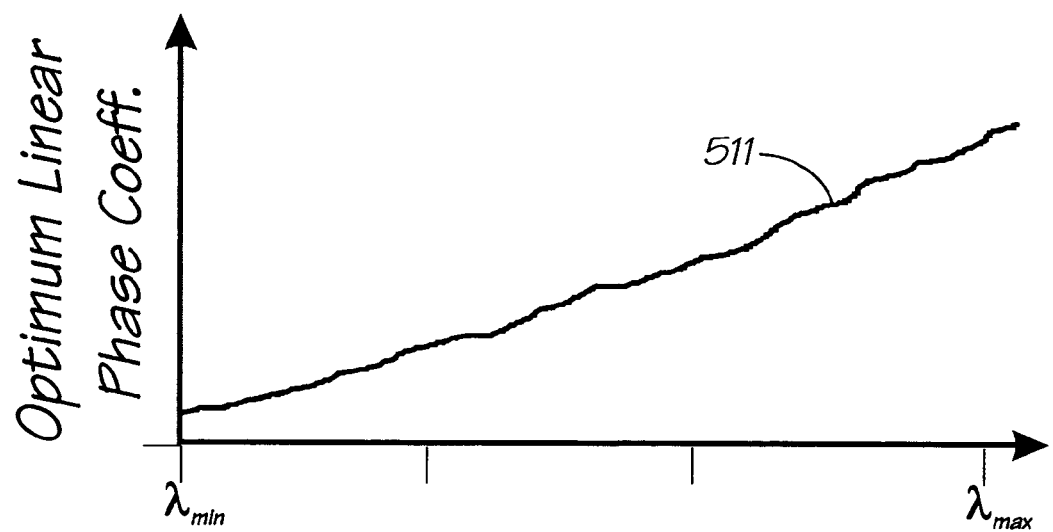
FIG. 20 shows a calibration function describing the optimum linear phase coefficient as a function of wavelength.
Figure 22:
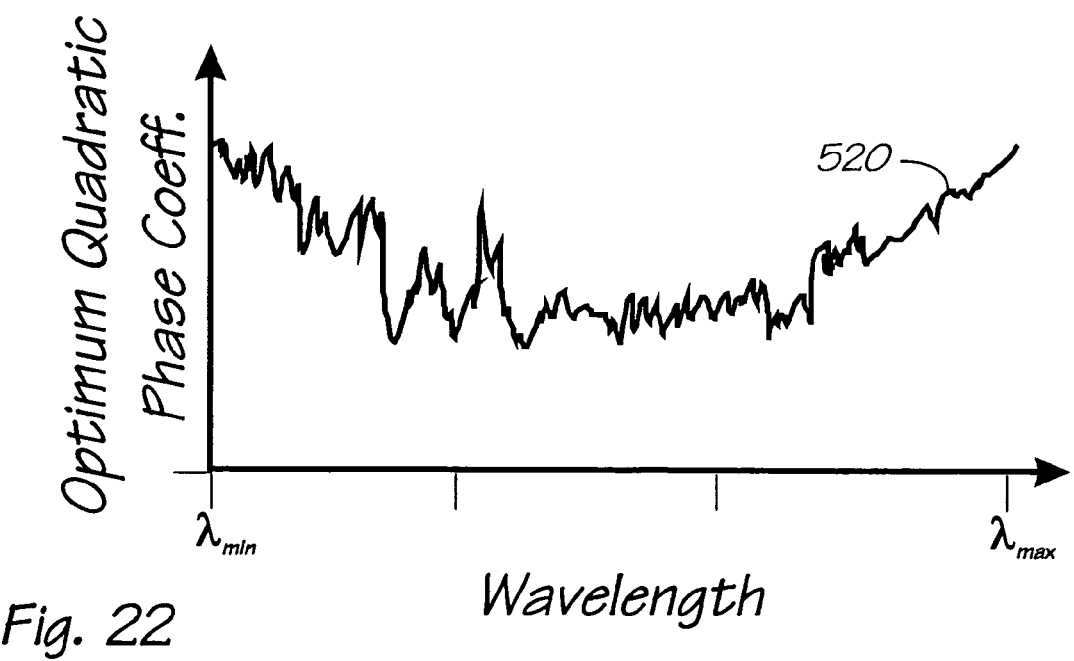
FIG. 22 shows a calibration function describing the optimum quadratic phase coefficient as a function of wavelength.

The data used to generate the graphs of FIGS. 20 and 22 are tabulated into an array 520 recording the optimum linear and quadratic phase coefficients for each wavelength. This array is stored in memory and the remainder of the calibration data can be deleted.

The above process is then repeated for each of the remaining output ports and similar arrays of calibration data generated. When completed, the output from the loss optimization calibration is in a form substantially similar to that shown in FIG. 23, i.e. a 3-dimensional data array. Each of the 2-dimensional arrays 520 corresponds to one of the available output ports and records the optimum linear phase coefficient 521 and quadratic phase coefficient 522 for each of the wavelength channels corresponding to the wavelength index 523.

To slightly reduce the data precision requirements further, the wavelength can be expressed as a wavelength channel index determined from the dispersion calibration previously considered. In this way, only a single data point is used to describe each individual wavelength channels, i.e. the pixel index in the dispersion axis that corresponds to the center of each wavelength channel.

In use, in the switching of a particular wavelength channel $\lambda_m$, the control software of the wavelength processing device firstly reads the port that the channel is to be directed to and calls up the appropriate page from the loss optimization calibration data corresponding to that port. The control software next reads the linear and quadratic coefficients and creates a phase profile to apply to the pixels of the SLM corresponding to the wavelength channel $\lambda_m$. The phase profile is formed into a modulo $2\pi$ function of the pixel levels necessary to generate the required phase shift since it is recognized that a phase shift of $2\pi$ is equivalent to a phase shift of zero i.e. each time the phase profile reaches $2\pi$, it is reset to a phase shift of zero and repeated. This is then added to the background phase level image from the phase retardance and dispersion calibration functions to be applied to the relevant pixels of the SLM.

Reflection Calibration

The primary purpose of the reflection calibration is to define a phase variation function which will counteract interference effects from multiple surfaces of the liquid crystal SLM device and from other surfaces within the optical system. It is also useful in minimizing the cross-talk between adjacent output ports due to light being present in higher diffraction orders after reflection from the SLM.

The ITO layer on the top surface of the SLM has a reflection coefficient typically of about 0.5%. Reflections from this layer can lead to two types of unwanted coupling effects:

reflection from the top surface of the ITO layer which does not pass through the liquid crystal and thus its phase is not modified by the SLM; and light which has been reflected from the back plane of the SLM (ie has passed through the liquid and had its phase modified) is reflected off the ITO layer and back through the liquid crystal. The reflected light has its phase modified a second time which results in a strong reflection being seen at the fiber array at twice the desired displacement.

Other unwanted reflections and interference effects of a similar nature can occur throughout the optical system, however the reflections from the ITO layer are a highly prominent factor in cross-talk between channels due to the additional phase modulation that the light sees on the second pass though the liquid crystal.

To correct for these effects, the ability to add multiple phase patterns together to create the final phase profile is exploited. A weak sinusoidal variation is added onto an existing phase profile (ie a holographic phase profile calculated from the loss optimization calibration step previously).

The sinusoidal modulation can be adjusted in both amplitude $A(x)$ and initial phase $\phi_0(x)$ (ie the phase at pixel 0) and is described by $$\phi_{refl}(x,y)=A(x)\sin(\phi_{lin}(x,y,p)+\phi_{quad}(x,y,p)+\phi_0(x)).$$

The goal of the phase variation function $\phi_{refl}$ is to deliberately couple a small fraction of the light into an adjacent optical fiber port where an unwanted signal is present. By suitable adjustment of the amplitude $A(x)$ and initial phase $\phi_0(x)$ of the light whilst monitoring the adjacent port, an appropriate combination of parameters can be found. $A(x)$ is increased until the light coupled to the adjacent port is as strong as that of the unwanted reflections, and $\phi_0(x)$ is varied such that the light is out-of-phase with the unwanted reflections, thereby canceling them out by destructive interference. The coefficients $A(x)$ and $\phi_0(x)$ are calibrated for each wavelength channel, although usually, only one output port and its adjacent output port need to be considered. The same coefficients are then used to apply a sinusoidal modulation to be to each of the phase profiles from the loss optimization calibration. This approach is valid since the output ports are usually equidistant from their nearest adjacent ports at a particular wavelength.

Dynamic Channel Equalization

An optical device offering DCE functionalities that can be electronically controlled and software-configured, offers valuable agility in its capacity to rapidly respond to changing network or system conditions, as well as providing simplicity in control and configuration processes. The device's ability to control the optical power of 100 wavelength channels or more in a compact module eliminates the need for multiple discrete components to control each individual channel, thus greatly reducing the complexity of the optical system.

Two of the main methods for providing DCE functionality on a per-channel basis are:

modification of the propagation direction of the light to affect the coupling efficiency with the output port; or blocking or canceling a known fraction of the light.

Figure 24:
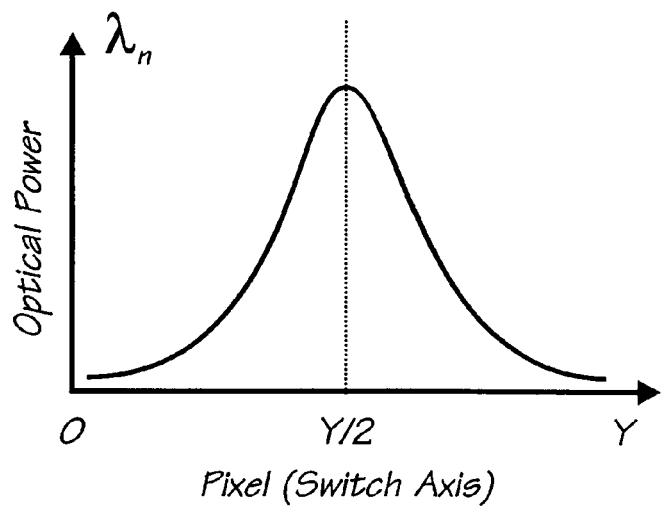
FIG. 24 shows the typical optical power distribution on the SLM of a particular wavelength channel in the switching axis.

Modification of the propagation direction slightly changes the displacement of the focused spot with respect to the output port, thus reducing the coupling efficiency of the light into the port. This technique, whilst valid, is very sensitive due to the typically Gaussian profile of the beam (similar to that shown in FIG. 24 with respect to the switching axis of the SLM). Very small displacements can generate very rapid and large changes in the attenuation. This method is also very sensitive to the alignment of the device itself. Small degradations of the optical components over time can cause large variances in the original designed attenuation characteristics. A further drawback with respect to diffractive devices is that, as the beam containing the most optical power is displaced, the higher order beams are displaced proportionally to both the displacement and the order of the diffracted beam. For example, the next highest order beam is displaced by twice the distance, and whist there may only be a small amount of power in this order, it can still be significant on the scale of the extinction ratio requirements in telecommunications systems. Thus, with this method, there is a large probability that these high order diffracted beams will coincide with other output ports and cause cross-talk between the output channels.

Figure 25:
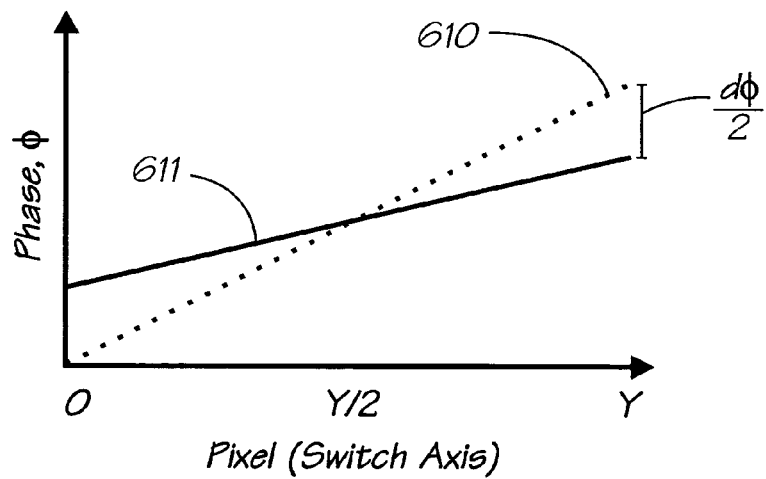
FIGS. 25-27 show examples of dynamic channel equalization functions for controlled attenuation of the optical power coupled to a particular output port of the optical device

DCE functions of this type can be implemented by slightly changing the linear coefficient m(x,p) in the phase profiles applied to the SLM—in effect, slightly rotating the phase profile. FIG. 25 shows a phase profile 610 which has been calibrated for optimum coupling to an output port. (As previously mentioned, the phase profile actually applied to the SLM pixels is usually a modulo $2\pi$ profile, however the profiles in FIG. 25 and subsequent profiles are not shown as modulus functions for clarity.) The DCE phase profile 611 has been rotated about the center pixel Y/2 of the SLM in the switching axis. The function defining this particular DCE function is $$\phi_{DCE}(x, y, p, g) = \phi(x, y, p)\left(1 - \frac{d\phi(x, p, g)}{\phi(x, y[Y-1], p)}\right) + \frac{d\phi(x, p, g)}{2}$$

where $d\phi(x,p,g)/2$ is the amount of phase rotation at the extreme pixels of the SLM. The change in phase $d\phi(x,p,g)$ is a function of:
 the pixel, x, in the dispersion plane of the SLM;
 the output port, p; and
 the attenuation, g, required on the particular wavelength channel.

Figure 26:
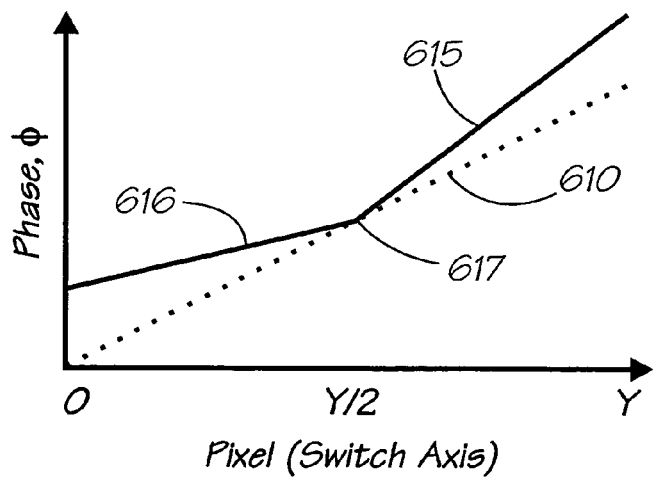

A variation on the displacement type DCE function that is easy to implement using a phase-based SLM is, instead of displacing the entire beam in one direction, to displace parts of the beam in opposite directions. An example phase profile which can be used in this case is shown in FIG. 26. The original phase profile 610 is split into two independent profiles 615 and 616 at a particular pixel 617. The separating pixel 617 is usually chosen to coincide substantially with the center of the beam profile striking the SLM. In this manner, approximately half of the light is slightly displaced in one direction and the other half is displaced in the opposite direction. This choice however can be arbitrary. This method does provide substantial attenuation control in certain situations by independent adjustment of the amount of rotation in each part of the phase profile without the extreme sensitivity of the previous case. However, large deviations from the initial phase profile 610 are occasionally necessary which result in substantial amounts of scattered light and hence cross-talk on other output ports.

Figure 27:
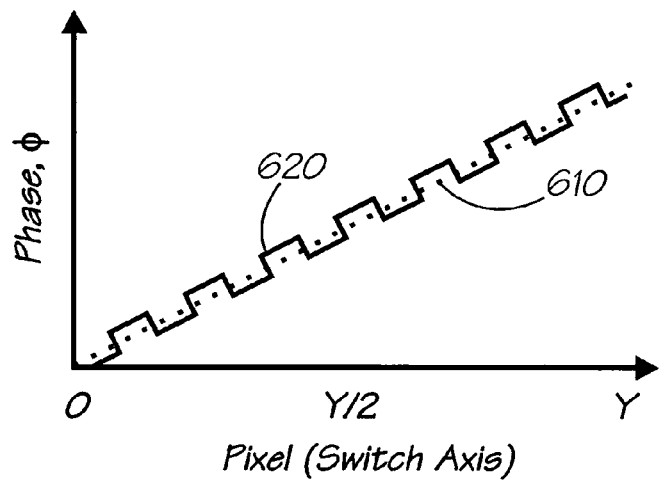

A further variation of displacement-based DCE function using the phase-based SLM is to couple a fraction of the light in a particular channel into a higher order diffraction order. This method does not actually alter the direction of the light, but rather redistributes the optical power in the diffraction orders, thus making it insensitive to long term alignment issues of the device. An example of a phase profile that can be used to implement this DCE is shown in FIG. 27. A square wave modulation is added to the original phase profile 610 to give the new DCE profile 620. The amplitude and phase of the additional modulation is modified to couple the desired amount of light into the higher diffraction order and thereby attenuate the light coupled into the output port. A sinusoidal modulation can also be implemented in a similar fashion.

A further variation again, is to take advantage of the finite width of the beam at the dispersion axis of the SLM. FIG. 28 shows the relative optical power of the spatially separated wavelength channels 625 at the SLM in the dispersion axis. The group of wavelength channels 626 is expanded in FIG. 29 which also shows the relative pixel level on each of the individual pixels. Each wavelength channel typically impinges on about 4 pixels in the dispersion axis (eg wavelength channel 630 is incident on the 4 SLM pixels 631). By varying the pixel level across the wavelength channel in this axis, the focused beam at the output port can be displaced substantially orthogonally to the axis of the fiber array. This is similar to the method shown in FIG. 25 of generating a phase ramp, but in the orthogonal dimension. This method significantly decreases the probability of higher order beams causing cross talk in the other output ports. However, due to the small number of pixels involved in the process per wavelength channel, the technique provides only very coarse attenuation control.

Figure 30:
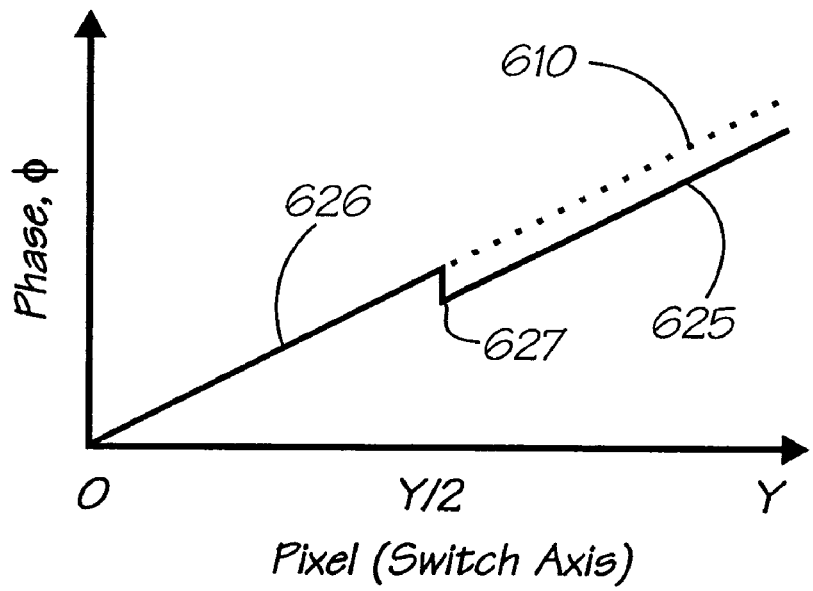
FIGS. 30-33 show further examples of dynamic channel equalization functions.

The second DCE method of blocking a fraction of the light is generally more difficult as it can require moving parts in the device. A variation on this theme using a liquid crystal SLM that acts on the phase of the light, is to destructively interfere a portion of a particular wavelength channel with itself. The light is thus attenuated according to the amount of destructive interference. This can be done by delaying the phase of one portion of the beam with respect to the other and causing a partial cancellation of the light in a controlled fashion. This method is again insensitive to long-term alignment issues since it does not rely on the accurate alignment of the focused beam spot with the output port. An example of a phase profile to implement this DCE function is shown in FIG. 30. The fraction of the beam which sees the phase profile 625 is delayed with respect to the fraction of the beam that sees the phase profile 626. The amount of phase delay is controlled by the depth of the step 627. The phase step 627 can be configured to occur at any SLM pixel as required. The drawback with this method is that large phase steps cause the light scatter and produce cross-talk on the other output ports of the device.

Figure 31:
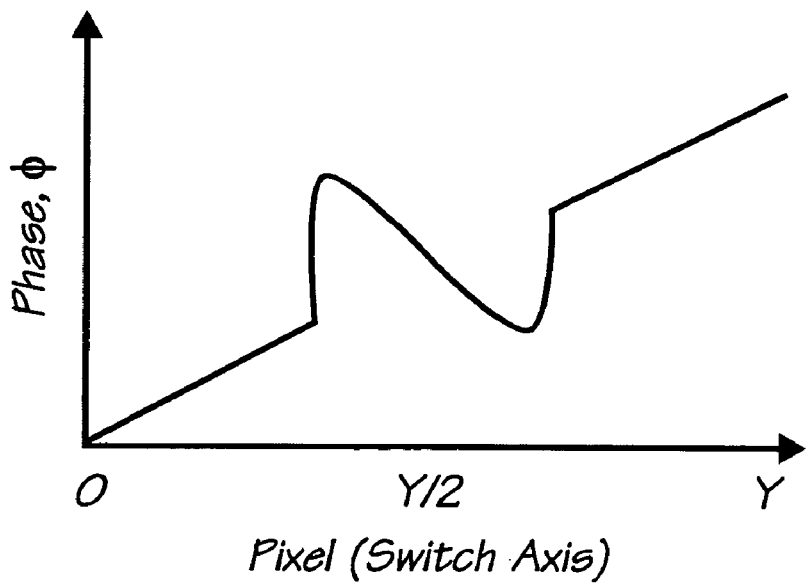
Figure 32:
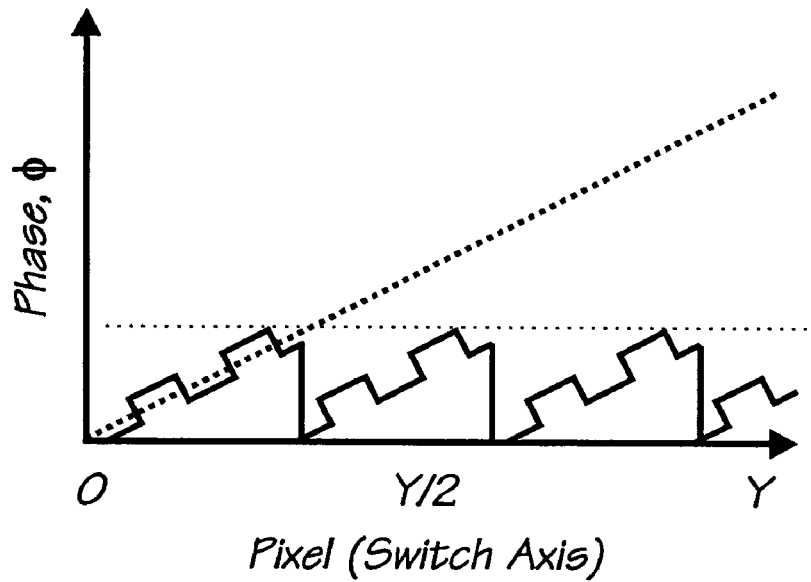
Figure 33:
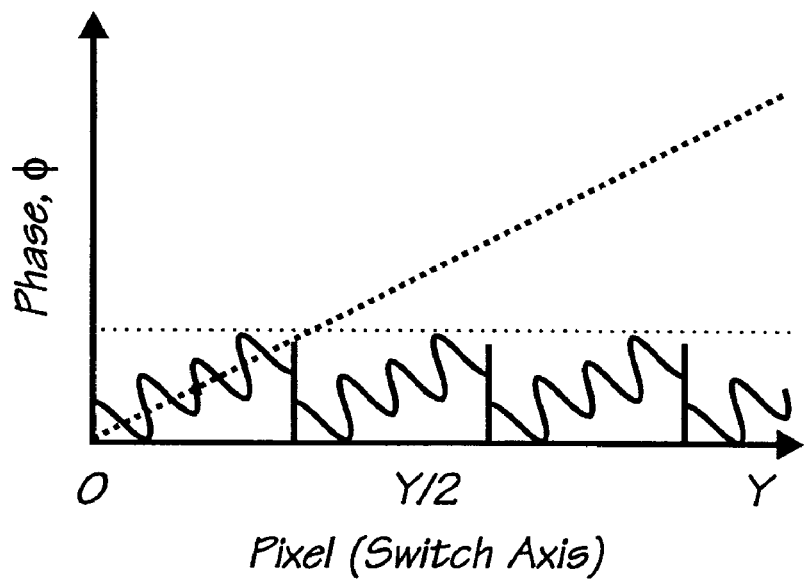

There are a vast number of other possible phase profiles. A few more examples are shown using a sinusoidal modulation in the central portion of the beam (FIG. 31) or a periodic modulation (a square wave in FIG. 32 and a sinusoid in FIG. 33) which has been constrained between the resets of the directional modulo $2\pi$ phase function.

Due to the large number of DCE functions that are available, a calibration is advantageous to identify suitable functions for a given situation. It is very likely that different functions are required for each separate output port and for a certain range of attenuation on that port. The DCE is likely to be the most time consuming calibration since all the ports are usually monitored to ensure acceptable cross-talk and extinction levels are achieved on each port. DCE functions also may be chosen that are insensitive to phase variations in the same way as the phase hologram functions used for the fundamental switching operations.

The calibration methods described herein, and/or shown in the drawings, are presented by way of example only and are not limiting as to the scope of the invention. Unless otherwise specifically stated, individual aspects and components of the calibration methods may be modified, or may have been substituted therefore known equivalents, or as yet unknown substitutes such as may be developed in the future or such as may be found to be acceptable substitutes in the future. The calibration methods may also be modified for a variety of applications while remaining within the scope and spirit of the claimed invention, since the range of potential applications is great, and since it is intended that the present calibration methods be adaptable to many such variations.

It will be appreciated that the methods described above at least substantially provide a suite of calibration techniques and methods for optimizing an optical device including a liquid crystal element for telecommunications applications.

What is claimed is:

1. A method of compensating for phase distortions, in an optical system including:
 an optical input port for projecting an input optical signal onto an optical phased matrix array, an optical phased matrix array including a plurality of individually addressable pixels thereon, each said pixel being drivable within a prescribed range of levels, and an optical output port for collecting a predetermined fraction of said optical signal received from said optical phased matrix array;

the method including the steps of:
(a) determining a plurality of transfer functions relating said level of each said pixel to the phase variation each said pixel introduces to light from said input optical signal which is incident thereon;
(b) controlling the level of selected ones of said pixels in accordance with a corresponding transfer function such that a fractional signal received at said output port is modified in phase to substantially compensate for optical phase distortions arising from said optical phased matrix array;
(c) determining a transfer function relating a wavelength signal to the pixels they are incident thereon; and
(d) associating selected ones of said pixels in accordance with said transfer function to said wavelength signals such that the phase of selected wavelength signals can be independently modified in accordance with requirements.

2. A method as claimed in claim 1 wherein said transfer functions are implemented in the form of a series of lookup tables relating said level of each said pixel to the phase variation each said pixel introduces to light from said optical signal which is incident thereon.

3. A method as claimed in claim 1 wherein said transfer functions further include substantial compensation for the optical phase distortion arising from the overall optical system.

4. A method as claimed in claim 1 wherein said optical system further includes an optical dispersion element for spatially separating wavelength signals from said optical signal.

5. A method as claimed in claim 1 wherein said optical system includes
a plurality of output ports and aid method further includes the steps of:
(e) determining a plurality of routing transfer functions relating the coupling between said input port and said output ports; and
(f) controlling the level of selected ones of said pixels in accordance with said routing transfer functions such that at least a fraction of selected ones of said wavelength signals is directed to at least one of said output ports.

6. A method as claimed in claim 5 further including the steps of:
(g) determining a transfer function relating an optical power of said wavelength signals that is coupled to optical output ports adjacent the desired output port to the amplitude and phase imparted to said wavelength signals due to multiple reflections in said optical system; and
(h) modifying said routing transfer functions to substantially cancel said optical power on said adjacent output ports.

7. A method as claimed in claim 1 wherein said optical system further includes a plurality of input ports.

8. A method as claimed in claim 1 wherein said method is utilised in a testing phase by testing selected regions of said optical phased matrix array.

9. A method as claimed in claim 1 wherein said optical phased matrix array is a liquid crystal spatial light modulator.

10. A method as claimed in claim 1 wherein said optical phased matrix array is a liquid crystal on silicon spatial light modulator.

11. A method of selecting a desired wavelength signal, in an optical system including:
an optical input port for projecting an input optical signal onto an optical phased matrix array,
an optical phased matrix array including a plurality of individually addressable pixels thereon, each said pixel being drivable within a prescribed range of levels,
an optical dispersion element for spatially separating wavelength signals from said optical signal, and
an optical output port for collecting a predetermined fraction of said optical signal received from said optical phased matrix array;
the method including the steps of:
(a) determining a transfer function relating said wavelength signals to said pixels they are incident thereon; and
(b) associating selected ones of said pixels in accordance with said transfer function to said wavelength signals such that a phase of said selected wavelength signals can be independently modified in accordance with requirements;
(c) determining a transfer function relating said wavelength signals to the pixels they are incident thereon; and
(d) associating selected ones of said pixels in accordance with said transfer function to said wavelength signals such that the phase of selected wavelength signals can be independently modified in accordance with requirements.

12. A method as claimed in claim 11 wherein said wavelength signals are standardized wavelength bands designated for telecommunications networks.

13. A method as claimed in claim 11 wherein said wavelength signals are designated by spacings of one of 200 GHz, 100 GHz, 50 GHz, 25 GHz, or 12.5 GHz.

14. A method as claimed in claim 11 wherein said step of associating selected ones of said pixels with said transfer function are reconfigurable according to requirements.

15. A method as claimed in claim 11 wherein the pixels in a selected region of said optical phased matrix array are associated with wavelength signals separated by a particular spacing and other pixels in other selected regions of said optical phased matrix array are associated with wavelength signals separated by different spacings according to requirements.

16. A method as claimed in claim 15 wherein said particular spacing and said different spacings are each selected from the group of 200 GHz, 100 GHz, 50 GHz, 25 GHz, or 12.5 GHz.

17. A method as claimed in claim 11 wherein said transfer function is implemented in the form of a lookup table relating a predetermined wavelength signal to the corresponding pixel that said predetermined wavelength signal is incident thereon.

18. A method of minimizing power variations in a fractional signal collected by output ports, in an optical system including:
an optical input port for projecting an input optical signal onto an optical phased matrix array,
an optical phased matrix array including a plurality of individually addressable pixels thereon, each said pixel being drivable within a prescribed range of levels, and a plurality of optical output ports, each for collecting a predetermined fraction of said optical signal received from said optical phased matrix array;

the method including the steps of:
(a) determining a plurality of pixel transfer functions relating said level of each said pixel to a phase variation each said pixel introduces to light from said input optical signal which is incident thereon;
(b) determining a plurality of routing transfer functions relating the coupling between said input port and said output ports by selection of appropriate levels of predetermined ones of said pixels;
(c) determining minimum and maximum levels of said phase variation; and
(d) controlling the level of selected ones of said pixels in accordance with a corresponding routing transfer function, said routing transfer function being constrained between said minimum and maximum levels, to direct at least a fraction of said optical signal to at least one of said output ports such that said power variations in the fraction of light collected by said output port are minimized.

19. A method as claimed in claim 18 wherein said routing transfer functions are substantially insensitive to phase variations in said pixel transfer functions.

20. A method as claimed in claim 18 wherein said minimum and maximum levels are reconfigurable to adjust for phase variations in said pixel transfer functions.

21. A method of minimizing time-varying variations of optical signals in an optical system including:
an optical input port for projecting an input optical signal onto an optical phased matrix array,
an optical phased matrix array including a plurality of individually addressable pixels thereon, each said pixel being drivable within a prescribed range of levels,
an optical output port for collecting a predetermined fraction of said optical signal received from said optical phased matrix array,
a plurality of pixel transfer functions relating said level of each said pixel to a phase variation each said pixel introduces to light from said input optical signal which is incident thereon, and
at least one routing transfer function describing the phase variation to be imparted by selected ones of said pixels to thereby couple said fraction of said optical signal between said input port and said output port, where said routing transfer function is constrained between selected minimum and maximum levels;
the method including the steps of:
(a) providing a detection element at said output port, said detection element providing a detector signal responsive to time-varying variations in said fraction of said optical signal collected by said output port; and
(b) modifying said maximum and minimum levels to substantially minimize said time-varying variations in response to said detector signal thereby substantially optimizing the performance of said optical system.

22. method as claimed in claim 21 wherein said optical system further includes a plurality of optical output ports, each output port including a corresponding detection element, and a plurality of routing transfer functions to couple selected fractions of said optical signal between said input port and at least one selected output ports in accordance with requirements.

23. A method of attenuating a selected fractional wavelength signal in an optical system including:

an optical input port for projecting an input optical signal onto an optical phased matrix array,
an optical phased matrix array including a plurality of individually addressable pixels thereon, each said pixel being drivable within a prescribed range of levels,
an optical output port for collecting a predetermined fraction of said optical signal received from said optical phased matrix array,
a plurality of pixel transfer functions relating said level of each said pixel to a phase variation each said pixel introduces to light from said input optical signal which is incident thereon,
an optical dispersion element for spatially separating wavelength signals from said optical signal,
a wavelength transfer function relating said wavelength signals to said pixels they are incident thereon to defined regions of said pixels for independent modification of said wavelength signals, and
at least one routing transfer function describing a phase variation to be imparted by selected said regions to thereby couple a fraction of said wavelength signal between said input port and said output port;
the method including the steps of:
(a) determining a plurality of equalization transfer functions relating the phase variation of selected pixels in said selected region to the amount of attenuation achieved on a selected wavelength signal;
(b) selecting a suitable equalization transfer function to give the required attenuation on a selected said fractional wavelength signal; and
(c) applying said selected equalization transfer function in conjunction with said routing transfer function to attenuate said fractional wavelength signal in accordance with requirements.

24. An optical system as claimed in claim 23 wherein said selected equalization transfer function causes said fractional wavelength signal to be directed away from said output port by a known distance thereby attenuating the light collected by said output port in accordance with requirements.

25. An optical system as claimed in claim 23 wherein said selected equalization transfer function causes a selected portion of said fractional wavelength signal to be directed away from said output port thereby attenuating the light collected by said output port in accordance with requirements.

26. An optical system as claimed in claim 23 wherein said selected equalization transfer function modifies the phase of selected portions of said wavelength signal such that said modified portions destructively interfere with other portions of said wavelength signal by a known amount thereby attenuating the amount of light collected by said output port in accordance with requirements.

27. An optical system as claimed in claim 23 wherein said optical system includes a plurality of output ports and step (b) further includes selection of an equalization transfer function for attenuation of a selected wavelength signal that does not cause a significant fraction of said optical signal to be collected by another of said optical output ports.

28. A calibration method for an optical device including the steps of:
(a) providing an optical system including at least one optical input port and at least one optical output port, where said input port delivers an optical input signal comprising of a plurality of wavelength signals to a liquid crystal spatial light modulator including a plurality of individually addressable pixels thereon that substantially couples said optical signal to output port;

(b) performing a background calibration of said spatial light modulator and said optical system;

(c) performing an efficiency calibration to optimize the coupling of a selected portion of said optical input signal between said input port and said output port as a function of wavelength;

(d) determining a transfer function relating said wavelength signals to the pixels they are incident thereon; and (e) associating selected ones of said pixels in accordance with said transfer function to said wavelength signals such that a phase of selected wavelength signals can be independently modified in accordance with requirements;

such that said pixels of said spatial light modulator can be operated as a dynamically reconfigurable grid.

29. A method as claimed in claim 28 wherein the background calibration of step (b) includes analysis of wavefront distortions and optical aberrations of said spatial light modulator and said optical system.

30. A method according to claim 29 wherein said background calibration further includes the correction of said wavefront distortions and aberration by appropriate modification on a pixel-by-pixel basis of the wavefront of light that impinges on said spatial light modulator.

31. A method as claimed in claim 28 wherein steps (a) and (b) result in a plurality of tabulated coefficients describing:

(i) the optical phase response of the individual pixels of said spatial light modulator;

(ii) a plurality of holographic phase modulation functions, which when applied to the pixels of said spatial light modulator, provides directional control of light which is incident on said pixels to couple said light between an input port and an output port of said optical system; and (iii) a plurality of phase variation functions for control over the coupling efficiency of said light between said input port and said output port.

32. A method as claimed in claim 31 further including a plurality of transfer functions to reconstruct said phase variation functions from said tabulated coefficients in accordance with requirements.

33. A method as claimed in claim 31 wherein said tabulated coefficients describing said optical phase response includes temperature specific information.

34. A method as claimed in claim 28 wherein said calibration method is a self-calibration method.

35. A method as claimed in claim 31 wherein said phase variation functions are formed from a holographic phase function.

36. A method as claimed in claim 28 wherein step (b) includes the steps of:

(b1) Performing a calibration of the phase retardance response to an optical signal of said spatial light modulator on a pixel-by-pixel basis; and (b2) Performing a calibration of the dispersion characteristics of said optical signal with respect to one axis of said spatial light modulator.

37. A method as claimed in claim 36 where the data obtained from step (b1) is retained and reprocessed using the results of step (b2).

38. A method as claimed in claim 28 wherein said optical system includes a plurality of optical output ports and step (c) includes the steps of:

(c1) determining a further plurality of tabulated coefficients and transfer functions to couple a required fraction of said optical signal to each of said output ports;

(c2) determining a plurality of first modification functions to modify said transfer functions of step (c1) to substantially account for non-uniformity across the surface of said spatial light modulator for each said output port; and (c3) determining a second modification function to modify said transfer functions of step (c1) to substantially minimise the effect of cross-talk on adjacent ones of said output ports.

39. A method as claimed in claim 28 wherein said spatial light modulator is a liquid crystal spatial light modulator.

40. A method as claimed in claim 28 wherein said spatial light modulator is a liquid crystal on silicon spatial light modulator.

41. A method as claimed in claim 31 wherein said said plurality of phase variation functions are substantially insensitive to variations in the response of said spatial light modulator.

42. A method as claimed in claim 31 further including a detection element at output port to monitor variations in the response of said spatial light modulator.

* * * * *

UNITED STATES PATENT AND TRADEMARK OFFICE
CERTIFICATE OF CORRECTION

PATENT NO.       : 7,457,547 B2                                    Page 1 of 1
APPLICATION NO.  : 10/984594
DATED            : November 25, 2008
INVENTOR(S)      : Frisken et al.

It is certified that error appears in the above-identified patent and that said Letters Patent is hereby corrected as shown below:

Claim 41, column 28, lines 37-38 should read as follows

"... wherein plurality ..."

Signed and Sealed this

Tenth Day of February, 2009

JOHN DOLL
*Acting Director of the United States Patent and Trademark Office*